(12) United States Patent
Hong et al.

(10) Patent No.: US 11,909,032 B2
(45) Date of Patent: *Feb. 20, 2024

(54) COMPOSITE CATHODE ACTIVE MATERIAL, CATHODE AND LITHIUM BATTERY EACH CONTAINING COMPOSITE CATHODE ACTIVE MATERIAL, AND PREPARATION METHOD OF CATHODE ACTIVE MATERIAL

(71) Applicants: Samsung Electronics Co., Ltd., Suwon-si (KR); Samsung SDI Co., Ltd., Yongin-si (KR)

(72) Inventors: Sukgi Hong, Seongnam-si (KR); Byongyong Yu, Suwon-si (KR); Donghee Yeon, Seoul (KR); Byungjin Choi, Seoul (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 7 days.

This patent is subject to a terminal disclaimer.

(21) Appl. No.: 16/504,620

(22) Filed: Jul. 8, 2019

(65) Prior Publication Data
US 2020/0136132 A1 Apr. 30, 2020

(30) Foreign Application Priority Data
Oct. 24, 2018 (KR) .................. 10-2018-0127694

(51) Int. Cl.
*H01M 4/00* (2006.01)
*H01M 4/36* (2006.01)
(Continued)

(52) U.S. Cl.
CPC ............ *H01M 4/366* (2013.01); *C01G 53/04* (2013.01); *C01G 53/50* (2013.01); *H01M 4/525* (2013.01);
(Continued)

(58) Field of Classification Search
CPC ...... H01M 4/366; H01M 4/525; H01M 4/628; H01M 2004/028; H01M 4/5825;
(Continued)

(56) References Cited

U.S. PATENT DOCUMENTS 9,209,455 B2 12/2015 Ofer et al.
9,537,148 B2 1/2017 Kaseda et al.
(Continued)

FOREIGN PATENT DOCUMENTS

EP 2963708 A1 1/2016
JP 2007213866 A 8/2007
(Continued)

OTHER PUBLICATIONS

Machine translation of JP-2013206679-A obtained Aug. 2022 (Year: 2013).*

(Continued)

*Primary Examiner* — Nicholas P D'Aniello
(74) *Attorney, Agent, or Firm* — CANTOR COLBURN LLP

(57) ABSTRACT

A composite cathode active material includes: a core including a plurality of primary particles; and a shell on the core, wherein the primary particles include a first lithium transition metal oxide comprising nickel, the shell includes a first layer and a second layer on the first layer, the first layer includes a first composition containing a first metal, the second layer includes a second composition containing phosphorus, and the first metal includes at least one or more metal, other than nickel, belonging to any of Groups 2 to 5

(Continued)

and Groups 7 to 15 of the Periodic Table of the Elements. Also a cathode, and a lithium battery each including the composite cathode active material, and a method of preparing the composite cathode active material.

29 Claims, 9 Drawing Sheets
(4 of 9 Drawing Sheet(s) Filed in Color)

(51) Int. Cl.
  *C01G 53/04*  (2006.01)
  *C01G 53/00*  (2006.01)
  *H01M 4/525* (2010.01)
  *H01M 4/62*  (2006.01)
  *H01M 4/02*  (2006.01)
(52) U.S. Cl.
  CPC ......... *H01M 4/628* (2013.01); *C01P 2002/72* (2013.01); *C01P 2002/85* (2013.01); *C01P 2004/04* (2013.01); *C01P 2006/40* (2013.01); *H01M 2004/028* (2013.01)
(58) Field of Classification Search
  CPC .. H01M 4/0471; H01M 4/1391; H01M 4/131; H01M 4/626; H01M 4/485; H01M 10/052; H01M 10/058; C01G 53/04; C01G 53/50; C01G 53/42; C01P 2002/72; C01P 2002/85; C01P 2004/04; C01P 2006/40; C01P 2002/54; C01P 2002/52; C01P 2004/61; C01P 2004/62; C01P 2004/64; C01P 2002/88; C01P 2002/20; C01P 2002/32; C01P 2002/76; Y02E 60/10
  See application file for complete search history.

(56) References Cited

U.S. PATENT DOCUMENTS

| | | | |
|---|---|---|---|
| 9,991,511 B2 | 6/2018 | Song et al. | |
| 10,777,814 B2 | 9/2020 | Matsuu | |
| 11,183,681 B2* | 11/2021 | Hong | H01M 4/485 |
| 2010/0119943 A1* | 5/2010 | Lee | H01M 10/0431 |
| | | | 429/231.95 |
| 2013/0183579 A1* | 7/2013 | Kim | C01G 45/1257 |
| | | | 429/206 |
| 2014/0197357 A1 | 7/2014 | Ofer et al. | |
| 2015/0340689 A1 | 11/2015 | Song et al. | |
| 2016/0006031 A1* | 1/2016 | Kaseda | H01M 4/131 |
| | | | 429/223 |
| 2016/0181611 A1 | 6/2016 | Cho et al. | |
| 2016/0276658 A1 | 9/2016 | Choi et al. | |
| 2017/0179484 A1 | 6/2017 | Park et al. | |
| 2017/0194637 A1 | 7/2017 | Ahn et al. | |
| 2017/0338471 A1 | 11/2017 | Zheng et al. | |
| 2017/0338473 A1 | 11/2017 | Cho | |
| 2017/0365859 A1 | 12/2017 | Park et al. | |
| 2018/0205084 A1 | 7/2018 | Ham et al. | |
| 2018/0294477 A1 | 10/2018 | Shin et al. | |
| 2018/0316009 A1 | 11/2018 | Park et al. | |
| 2019/0123347 A1* | 4/2019 | Kim | H01M 4/485 |
| 2019/0372109 A1* | 12/2019 | Moon | H01M 10/0525 |
| 2020/0112024 A1 | 4/2020 | Shin et al. | |
| 2020/0136126 A1 | 4/2020 | Hong et al. | |

FOREIGN PATENT DOCUMENTS

| | | | |
|---|---|---|---|
| JP | 2013206679 A | * | 10/2013 |
| JP | 2014118335 A | | 6/2014 |
| JP | 2015214465 A | | 12/2015 |
| JP | 2017031006 A | | 2/2017 |
| JP | 2018067549 A | | 4/2018 |
| JP | 2018092793 A | | 6/2018 |
| KR | 20130084616 A | | 7/2013 |
| KR | 20150134161 A | | 12/2015 |
| KR | 101622352 B1 | | 5/2016 |
| KR | 1020170063396 A | | 6/2017 |
| KR | 1020170071945 A | | 6/2017 |
| KR | 1020170079942 A | | 7/2017 |
| KR | 1020170142410 A | | 12/2017 |
| KR | 1020180084673 A | | 7/2018 |
| KR | 1020180121266 A | | 11/2018 |
| WO | 2017056585 A1 | | 4/2017 |

OTHER PUBLICATIONS

Liu et al., "Nickel-Rich Layered Lithium Transitional-Metal Oxide for High-Energy Lithium-Ion Batteries", Angewandte Reviews, 54, 2015, pp. 4440-4458.
Vetter et al., "Ageing mechanisms in lithium-ion batteries", Journal of Power Sources, 147, 2005, pp. 269-281.
Zhang et al., "facet-Dependent Rock-Salt Reconstruction on the Surface of Layered Oxide Cathodes", Chemistry of Materials, 30, 2018, pp. 692-699.
European Search Report for European Patent Application for 19195866.9 dated Jul. 13, 2020.
Korean Office Action for Korean Patent Application No. 10-2018-0127694 dated Jul. 27, 2023.
Chinese Office Action for Chinese Patent Application No. 201901962058.7 dated Nov. 28, 2023.

* cited by examiner

COMPOSITE CATHODE ACTIVE MATERIAL, CATHODE AND LITHIUM BATTERY EACH CONTAINING COMPOSITE CATHODE ACTIVE MATERIAL, AND PREPARATION METHOD OF CATHODE ACTIVE MATERIAL

CROSS-REFERENCE TO RELATED APPLICATION

This application claims priority to and the benefit of Korean Patent Application No. 10-2018-0127694, filed on Oct. 24, 2018, in the Korean Intellectual Property Office, the content of which is incorporated herein in its entirety by reference.

BACKGROUND

1. Field

The present disclosure relates to a composite cathode active material, a cathode and a lithium batteries each including the same, and methods of preparing the composite cathode active material.

2. Description of the Related Art

With the development of various compact, high-performance devices, there is an increasing demand for lithium batteries having high energy density in addition to compactness and high performance. That is, high-capacity lithium batteries are becoming increasingly important.

To realize lithium batteries satisfying such demands, research into cathode active materials having improved capacity has been conducted.

Ni-based cathode active materials are attractive because the can have high capacity and low cost, however their lifespan characteristics and thermal stability need improvement.

Therefore, there is a need to develop a method of preventing deterioration of battery performance while using a Ni-based cathode active material.

SUMMARY

Provided is a composite cathode active material capable of preventing deterioration of battery performance by inhibiting a side reaction of the composite cathode active materials.

Provided is a cathode including the composite cathode active material.

Provided is a lithium battery including the cathode.

Provided are methods of preparing the composite cathode active material.

Additional aspects will be set forth in part in the description which follows and, in part, will be apparent from the description, or may be learned by practice of the presented embodiments.

According to an aspect of an embodiment, a composite cathode active material includes: a core including a plurality of primary particles; and a shell formed on the core, wherein the primary particles include a first lithium transition metal oxide including nickel, the shell includes a first layer and a second layer on the first layer, the first layer includes a first composition containing a first metal, the second layer includes a second composition containing phosphorus, and the first metal includes at least one metal, other than nickel, belonging to any of Groups 2 to 5 and Groups 7 to 15 of the Periodic Table of the Elements.

According to an aspect of another embodiment, a cathode includes the composite cathode active material.

According to an aspect of another embodiment, a lithium battery includes the cathode; an anode; and an electrolyte between the cathode and the anode.

According to an aspect of another embodiment, a method of preparing a composite cathode active material includes: providing a first lithium transition metal oxide; mixing the first lithium transition metal oxide with a first metal precursor to prepare a first composition; mixing the first composition with a phosphorous precursor to prepare a second composition; drying the second composition; and heat-treating the dried second composition at a temperature of about 400° C. to about 1000° C. under an oxidizing atmosphere to prepare the composite cathode active material.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

These and/or other aspects will become apparent and more readily appreciated from the following description of the embodiments, taken in conjunction with the accompanying drawings in which.

DETAILED DESCRIPTION

Figure 1A:
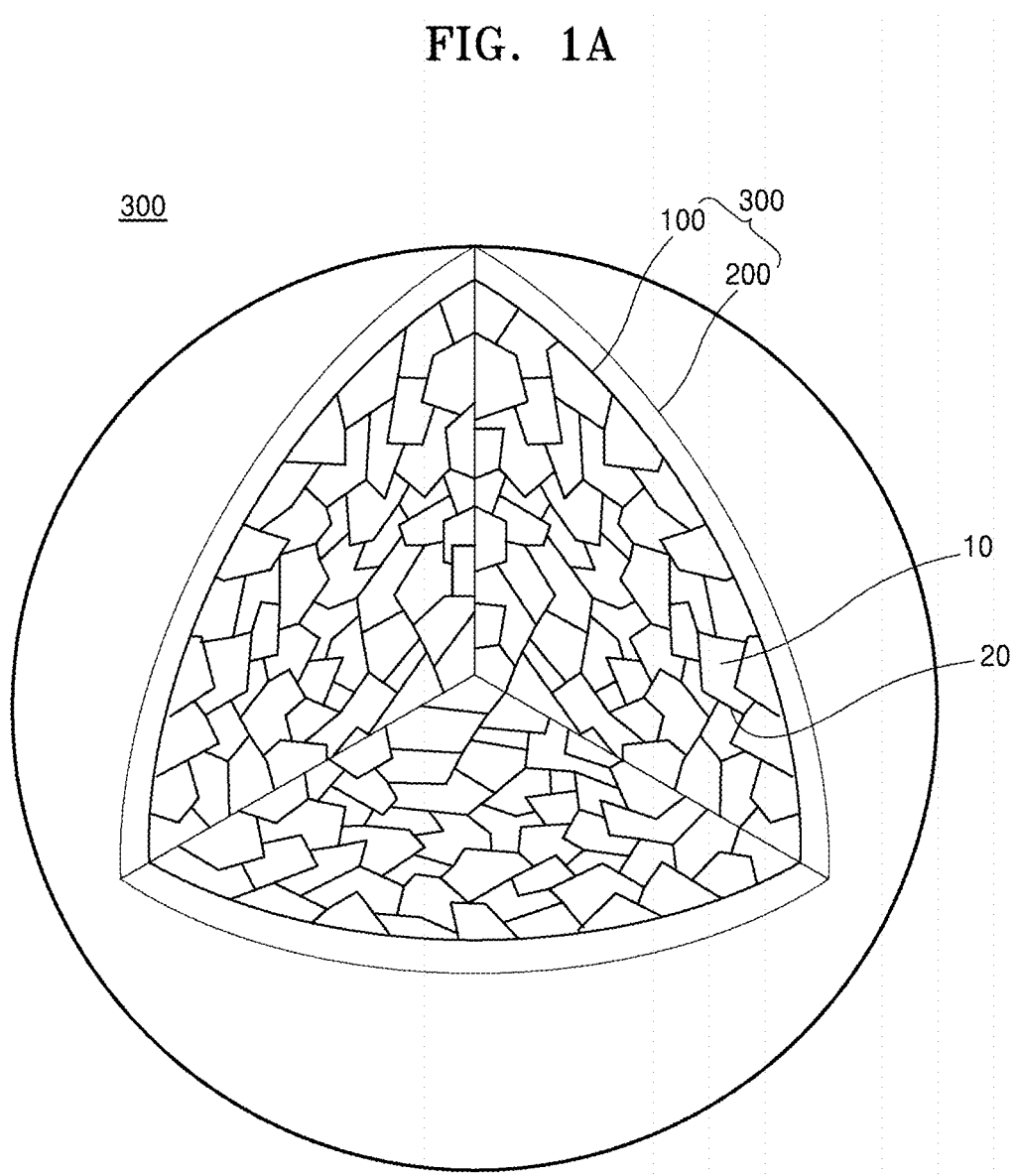
FIG. 1A is a schematic diagram partially illustrating an internal structure of a composite cathode active material according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

As the invention allows for various changes and numerous embodiments, particular embodiments will be illustrated in the drawings and described in detail in the written description. However, there is no intent to limit the disclosure to the particular forms disclosed, but on the contrary, the disclosure is to cover all modifications, equivalents, and alternatives falling within the spirit and scope of the disclosure.

The terms used in the present specification are merely used to describe particular embodiments, and are not intended to limit the present disclosure. An expression used in the singular encompasses the expression of the plural, unless it has a clearly different meaning in the context. Hereinafter, it is to be understood that the terms such as "including" or "having" are intended to indicate the existence of features, numbers, operations, components, parts, elements, materials, or combinations thereof disclosed in the specification, and are not intended to preclude the possibility that one or more other features, numbers, operations, components, parts, elements, materials, or combinations thereof may exist or may be added. The "/", as used herein, may be interpreted as either "and" or "or".

In the drawings, thicknesses of layers and regions may be enlarged or reduced for clarity. Throughout the specification, like reference numerals denote like elements. Throughout the specification, it will be understood that when one element such as layer, region, or plate, is referred to as being "on" another element, it can be directly on the other element, or intervening elements may also be present therebetween. It will be understood that, although the terms first, second, etc. may be used herein to describe various components, these components should not be limited by these terms. These terms are only used to distinguish one component from another.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer or section from another element, component, region, layer, or section. Thus, "a first element," "component," "region," "layer," or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Transition metal" as defined herein refers to an element of Groups 3 to 11 of the Periodic Table of the Elements.

Hereinafter, a composite cathode active material, and a cathode and a lithium battery, each including the same, and a method of preparing the composite active material will be described in greater detail.

A composite cathode active material according to an embodiment includes: a core including a plurality of primary particles; and a shell formed on the core, wherein each primary particle includes a nickel (Ni)-based first lithium transition metal oxide comprising nickel, the shell has a first layer and a second layer located on the first layer, the first layer includes a first composition containing a first metal, the second layer includes a second composition containing phosphorus (P), the first metal comprises at least one metal, other than nickel, belonging to any of Groups 2 to 5 and Groups 7 to 15 of the Periodic Table of the Elements.

Referring to FIG. 1A, a composite cathode active material 300 includes: a core 100 having a plurality of primary particles 10; and a shell 200 formed on the core 100. The core 100 is a secondary particle including the plurality of primary particles 10. For example, the primary particles 10 are crystallites having the same crystal structure in the primary particles 10. The primary particles 10 include a Ni-based first lithium transition metal oxide comprising nickel, and the shell 200 has a multi-layered structure including the first layer (not shown) and the second layer (not shown) located on the first layer. The first layer includes the first composition containing the first metal, and the second layer includes the second composition containing phosphorus (P). The first metal includes at least one metal, other than nickel, belonging to any of Groups 2 to 5 and Groups 7 to 15 of the Periodic Table of the Elements. The Ni-based first lithium transition metal oxide has a layered crystal structure.

Hereinafter, theoretical basis of the improved performance of the composite cathode active material according to an embodiment will be described. This description is for the purpose of understanding the present disclosure and is not intended to limit the present disclosure.

The first layer including the first composition containing the first metal is located on the core 100 of the composite cathode active material 300, for example, for surface stabilization of the core 100 and for restoration of performance of the active material deteriorated by washing the core 100 with water. Since a metal included in the core 100 is intermixed with a metal included in the first layer by heat treatment performed during a process of preparing the first layer, effects of stabilizing the surface structure of the core 100 and restoring performance of the active material may be obtained. The second layer including the P-containing second composition is additionally formed on the first layer. The second layer serves as a surface protecting layer to protect the core and/or the first layer and inhibits a side reaction thereof with an electrolytic solution. In addition, since the second layer including the P-containing second composition is additionally formed on the first layer, for example, elution of Ni ions from the core 100 to the electrolytic solution may effectively be inhibited. Also, since a precursor of the second composition reacts with lithium remaining on the core 100 and/or the first layer during a process of forming the second layer, an amount of lithium remaining on the surface of the composite cathode active material 300 is reduced. Thus, for example, the side reaction between the composite cathode active material 300 and the electrolytic solution, if present, and gas generation, are effectively inhibited. In addition, since a stable artificial solid electrolyte interphase (SEI) is formed by reactions between the second layer and moisture or HF during initial charging and discharging of a lithium battery, generation of by-products caused by additional side reactions between the composite cathode active material 300 and moisture or HF remaining in the electrolytic solution is inhibited. Thus, the surface of the composite cathode active material 300 is stabilized. That is, since the second layer serves as a protecting layer having lithium ion conductivity, stability of the composite cathode active material 300 is improved. In addition, since the second layer is polar and has improved wettability to the electrolytic solution, interfacial resistance between the composite cathode active material 300 and the electrolytic solution is decreased. Thus, although the second layer is added thereto, internal resistance of the lithium battery including the composite cathode active material 300 is maintained or decreased. As a result, cycle characteristics and thermal stability of the lithium battery including the composite cathode active material 300 are improved.

Among transition metals included in the first lithium transition metal oxide included in the composite cathode active material 300, an amount of Ni may be about 70 mole percent (mol %) or more, about 71 mol % or more, about 75 mol % or more, about 80 mol % or more, about 85 mol % or more, about 90 mol % or more, about 93 mol % or more, about 95 mol % or more, or about 97 mol % or more, or about 71 mol % to about 99 mol %, about 75 mol % to about 98 mol %, or about 78 mol % to about 90 mol %, based on a total transition metal content of the first lithium transition metal oxide. When the amount of Ni included in the first lithium transition metal oxide is 70 mol % or more, a high capacity may be obtained. Thus, a lithium battery providing a high capacity is realized.

The first composition included in the first layer has a first phase, and the second composition included in the second layer has a second phase distinguished from the first phase. The first phase and the second phase are different, for example, in crystal structure, composition, or both.

For example, the first composition includes at least one phase of a phase having a layered crystal structure and a phase having a spinel crystal structure. For example, the first composition includes a phase having the layered crystal structure belonging to an R-3m space group. For example, the first composition includes a spinel crystal structure belonging to an Fd-3m space group. When the first composition includes such a phase, cycle characteristics and thermal stability of the lithium battery are further improved.

The first layer is formed on the primary particles constituting the core, and a concentration of the first metal included in the first layer is greater than a concentration of the first metal included in the primary particles. Referring to FIGS. 3B and 4B, the first layer is formed on the primary particles constituting the core and a concentration of Co included in the first layer is greater than a concentration of Co included in the primary particles. Referring to FIGS. 3B and 4B, a greater concentration of Co corresponds to a brighter color. For example, a concentration of the first metal per unit area of the first layer is greater than that of the first metal per unit area of the primary particles.

In the composite cathode active material, for example, a thickness of the second layer of the shell is greater than that of the first layer. As the second layer has a greater thickness than that of the first layer, elution of metal ions and side reactions between the composite cathode active material and the electrolytic solution are more effectively inhibited. Thus, although the second layer having a greater thickness than that of the first layer is added, the lithium battery including the composite cathode active material 300 has improved cycle characteristics.

For example, the thickness of the first layer is 50 nanometers (nm) or less, 40 nm or less, 30 nm or less, 20 nm or less, 10 nm or less, or 5 nm or less. For example, the thickness of the first layer may be from about 1 nm to about 50 nm, from about 1 nm to about 40 nm, from about 1 nm to about 30 nm, from about 1 nm to about 20 nm, from about 1 nm to about 10 nm, or from about 1 nm to about 5 nm, about 2 nm to about 50 nm, from about 4 nm to about 40 nm, from about 6 nm to about 30 nm, or from about 8 nm to about 20 nm. When the first layer has a thickness within the ranges above, cycle characteristics and thermal stability of the lithium battery are further improved. For example, the thickness of the second layer is about 500 nm or less, about 400 nm or less, about 300 nm or less, about 200 nm or less, about 100 nm or less, or about 50 nm or less. For example, the thickness of the second layer may be from about 10 nm to about 500 nm, from about 10 nm to about 400 nm, from about 10 nm to about 300 nm, from about 10 nm to about 200 nm, or from about 10 nm to about 100 nm, or 20 nm to about 500 nm, from about 30 nm to about 400 nm, or from about 50 nm to about 300 nm. When the second layer has a thickness within the ranges above, cycle characteristics and thermal stability of the lithium battery are further improved.

In the composite cathode active material, a thickness of the shell including the first layer and the second layer is, for example, about 550 nm or less, about 450 nm or less, about 350 nm or less, about 250 nm or less, about 150 nm or less, or about 50 nm or less. For example, the thickness of the shell may be from about 10 nm to about 550 nm, from about 10 nm to about 450 nm, from about 10 nm to about 350 nm, from about 10 nm to about 250 nm, from about 10 nm to about 150 nm, or from about 10 nm to about 50 nm, about 20 nm to about 550 nm, from about 40 nm to about 450 nm, from about 60 nm to about 350 nm, from about 80 nm to about 250 nm, from about 100 nm to about 150 nm. When the shell has a thickness within the ranges above, cycle characteristics and thermal stability of the lithium battery are further improved.

In the composite cathode active material, the shell partially or completely covers the surface of the core. For example, the shell covers at least about 10%, at least about 20%, at least about 30%, at least about 40%, or at least about 50%, or about 10% to about 100%, about 20% to about 98%, or about 30% to about 90% of an entire surface of the core. The shell may be formed on the core in the form of discontinuous islands or as a continuous coating layer. Referring to FIGS. 4A to 4D, for example, the shell is located on a plurality of primary particles exposed through the surface of the core.

For example, the first composition is located on, e.g., directly on, the primary particles constituting the core and/or on the secondary particle corresponding to the core.

The first metal included in the first composition may be at least one of, for example, Co, Mg, Zr, Al, Mn, Si, Pd, Ti, Sn, Ir, Pt, Ru, Ce, B, Nb, V, Fe, and Zn. When the first composition includes such a first metal, cycle characteristics and thermal stability of the lithium battery including the composite cathode active material are further improved. When the first layer includes, for example, Co which provides improved discharge capacity, a capacity decrease of the composite cathode active material may be inhibited. When the first layer includes, for example, Mg, structural stability of the composite cathode active material is improved, thereby improving lifespan characteristics of the lithium battery including the composite cathode active material.

In the composite cathode active material, the first composition is, for example, a composition including the first metal and oxygen, or a composition including lithium, the first metal, and oxygen. For example, the first composition includes about 0 mole to about 3.3 moles of lithium per 1 mole of the first composition, about 0.7 moles to about 3.3 moles of the first metal per 1 mole of the first composition, and about 1.7 moles to about 4.3 moles of oxygen per 1 mole of the first composition. For example, the first composition includes about 0 mole to about 3.2 moles of lithium per 1 mole of the first composition, about 0.8 moles to about 3.2 moles of the first metal per 1 mole of the first composition, and about 1.8 moles to about 4.2 moles of oxygen per 1 mole of the first composition. For example, the first composition includes about 0 mole to about 3.1 moles of lithium per 1 mole of the first composition, about 0.9 moles to about 3.1 moles of the first metal per 1 mole of the first composition, and about 1.9 moles to about 4.1 moles of oxygen per 1 mole of the first composition. When the first composition includes the components within the ranges described above, cycle characteristics and thermal stability of the lithium battery including the composite cathode active material are further improved.

For example, the first composition has a composition represented by Formula 1.

$$Li_aM1_bO_c \quad \text{Formula 1}$$

In Formula 1, M1 includes at least one of Co, Mg, Zr, Al, Mn, Si, Pd, Ti, Sn, Ir, Pt, Ru, Ce, B, Nb, V, Fe, and Zn, $0 \leq a \leq 3.1$, $0.9 \leq b \leq 3.1$, and $1.9 \leq c \leq 4.1$.

For example, the first composition includes at least one of $Co_3O_4$, $MgO$, $Li_xCoO_2$ ($0 < x \leq 1.5$), and $Li_2ZrO_3$.

In the composite cathode active material, an amount of the first composition, or the first metal, included in the first layer is, for example, about 10 parts by weight or less, about 5 parts by weight or less, about 4 parts by weight or less, about 3 parts by weight or less, about 2 parts by weight or less, or about 1 part by weight based on 100 parts by weight of the first lithium transition metal oxide. The amount of the first composition included in the first layer is, for example, from about 0.01 parts by weight to about 10 parts by weight, from about 0.05 parts by weight to about 5 parts by weight, from about 0.1 parts by weight to about 4 parts by weight, from about 0.1 parts by weight to about 3 parts by weight, from about 0.1 parts by weight to about 2 parts by weight, or from about 0.1 parts by weight to about 1 part by weight, based on 100 parts by weight of the first lithium transition metal oxide. When the first layer includes the first composition, or the first metal, within the ranges above, cycle characteristics and thermal stability of the lithium battery including the composite cathode active material are further improved.

In the composite cathode active material, the second composition is, for example, a composition including the first metal, phosphorus (P), and oxygen or a composition including lithium, the first metal, phosphorus (P), and oxygen. For example, the second composition includes 0 moles to about 3.3 moles of lithium per 1 mole of the second composition, about 0.7 moles to about 3.3 moles of the first metal per 1 mole of the second composition, about 0.7 moles to about 2.3 moles of phosphorus per 1 mole of the second composition, and about 3.7 moles to about 8.3 moles of the oxygen per 1 mole of the second composition. For example, the second composition includes about 0 mole to about 3.2 moles of lithium per 1 mole of the second composition, about 0.8 moles to about 3.2 moles of the first metal per 1 mole of the second composition, about 0.8 moles to about 2.2 moles of phosphorus per 1 mole of the second composition, and about 3.8 moles to about 8.2 moles of the oxygen per 1 mole of the second composition. For example, the second composition includes about 0 mole to about 3.1 moles of lithium per 1 mole of the second composition, about 0.9 moles to about 3.1 moles of the first metal per 1 mole of the second composition, about 0.9 moles to about 2.1 moles of phosphorus per 1 mole of the second composition, and about 3.6 moles to about 8.4 moles of the oxygen per 1 mole of the second composition. When the second composition includes the components within the ranges described above cycle characteristics and thermal stability of the lithium battery including the composite cathode active material are further improved. The second composition includes, for example, a phosphate compound.

The second composition has a composition represented by Formula 2 below.

$$Li_aM2_b(PO_4)_c \qquad \text{Formula 2}$$

In Formula 2, M2 includes at least one of Co, Mg, Zr, Al, Mn, Si, Pd, Ni, Ti, Sn, Mo, Ir, Pt, Ru, Ce, B, Nb, V, Fe, and Zn, $0 \le a \le 3.1$, $0.9 \le b \le 3.1$, and $0.9 \le c \le 2.1$.

For example, the second composition includes at least one of $Li_3PO_4$, $LiCoPO_4$, and $Co_3(PO_4)_2$.

In the composite cathode active material, an amount of the second composition or phosphorus (P) included in the second layer is, for example, about 10 parts by weight or less, about 5 parts by weight or less, about 4 parts by weight or less, about 3 parts by weight or less, about 2 parts by weight or less, or about 1 part by weight or less, based on 100 parts by weight of the first lithium transition metal oxide. The amount of the second composition or phosphorous (P) included in the second layer is, for example, from about 0.01 parts by weight to about 10 parts by weight, from about 0.05 parts by weight to about 5 parts by weight, from about 0.1 parts by weight to about 4 parts by weight, from about 0.1 parts by weight to about 3 parts by weight, from about 0.1 parts by weight to about 2 parts by weight, or from about 0.1 parts by weight to about 1 part by weight. When the second layer includes the second composition or phosphorus (P) within the ranges above, cycle characteristics and thermal stability of the lithium battery including the composite cathode active material are further improved.

The second composition may be located on the primary particles constituting the core and/or on the secondary particle corresponding to the core. For example, the second layer is located on the first layer and selectively on the core. For example, a portion of the second layer is located on the surface of the core.

Figure 1B:
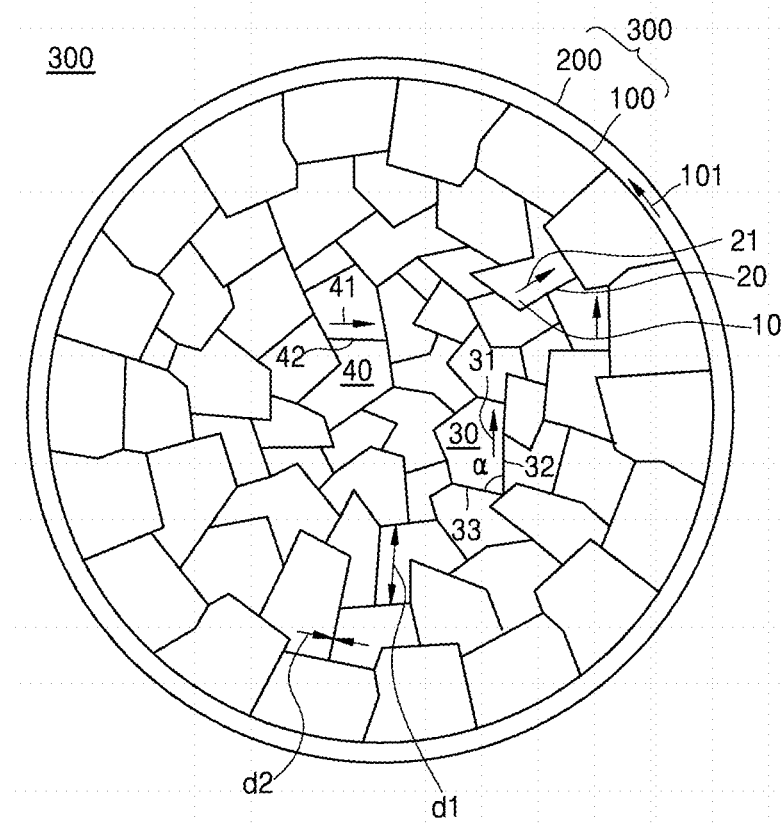
FIG. 1B is a schematic cross-sectional view of the composite cathode active material according to the embodiment.

Referring to FIGS. 1A and 1B, in the composite cathode active material 300, the core 100 includes grain boundaries 20, each located between adjacent primary particles among the plurality of primary particles 10, and the grain boundaries 20 include a second metal-containing third composition. Since the grain boundaries 20, each located between adjacent primary particles among the plurality of primary particles 10 constituting the core 100 of the composite cathode active material 300 include the third composition, lithium ion conductivity increases in the core 100 and elution of Ni ions from the primary particles 10 inside the core 100 to the electrolytic solution permeated into the core 100 is inhibited. Also, a side reaction between the primary particles 10 and the electrolytic solution is inhibited in the core 100. Thus, cycle characteristics of the lithium battery including the composite cathode active material 300 are improved. In addition, since the amount of lithium remaining on the surfaces of the plurality of primary particles 10 inside the core 100 is reduced, deterioration of the composite cathode active material 300 is inhibited and gas generation decreases, thereby improving thermal stability of the lithium battery. Since the third composition included in the grain boundaries 20, located between adjacent primary particles 10, prevents the surfaces of the primary particles 10 from being damaged during a process of washing the composite cathode active material 300, lifespan characteristics of the lithium battery may not be impaired. Since the third composition included in the grain boundaries 20 each located between adjacent primary particles 10 prevents occurrence of cracks between the primary particles 10 by buffering variations in volumes of the primary particles 10 caused by charging and discharging, a decrease in mechanical strength of the composite cathode active material 300 is prevented even after being used for a long time, thereby preventing deterioration of the lithium battery. In addition, since the lithium transition metal oxide included in the primary particles 10 is doped with the second metal included in the third composition, a crystal structure of the lithium transition metal oxide is stabilized, and thus cycle characteristics of the lithium battery including the composite cathode active material 300 are further be improved.

For example, the third composition included in the grain boundary 20 has a third phase distinguished from the phase of the primary particles 10. The third phase may be different than a phase of the primary particles 10 by structure, composition, or both. The third phase has, for example, a monoclinic crystal structure. Since the third composition has the monoclinic crystal structure, lithium ions may two-dimensionally move in the grain boundaries 20 including the third composition, lithium ion conductivity is increased in the core 100, thereby improving cycle characteristics. For example, the third composition has a monoclinic crystal structure belonging to a C2/m, C12/c1, or C2/c space group. Since the third composition has the monoclinic crystal structure belonging to the C2/m, C12/c1, or C2/c space group, cycle characteristics and thermal stability of the lithium battery including the composite cathode active material are further improved.

The second metal included in the third composition is, for example, of Zr, Al, Co, Mg, Mn, Si, Mo, Pd, Ti, Sn, Ir, Pt, Ru, Ce, B, Nb, V, Fe, and Zn. Since the third composition includes the second metal, charging and discharging characteristics of the lithium battery including the composite cathode active material 300 are further be improved.

In the composite cathode active material, the third composition may include lithium, the second metal, and oxygen. For example, the third composition includes about 1.7 moles to about 2.3 moles of lithium per 1 mole of the third composition, about 0.7 moles to about 1.3 moles of the second metal per 1 mole of the third composition, and about 2.7 moles to about 3.3 moles of oxygen per 1 mole of the third composition. For example, the third composition includes about 1.8 moles to about 2.2 moles of lithium per 1 mole of the third composition, about 0.8 moles to about 1.2 moles of the second metal per 1 mole of the third composition, and about 2.8 moles to about 3.2 moles of oxygen per 1 mole of the third composition. For example, the third composition includes about 1.9 moles to about 2.1 moles of lithium per 1 mole of the third composition, about 0.9 moles to about 1.1 moles of the second metal per 1 mole of the third composition, and about 2.9 moles to about 3.1 moles of oxygen per 1 mole of the third composition.

For example, the third composition has a composition represented by Formula 3 below.

$$Li_aM3_bO_c \qquad \text{Formula 3}$$

In Formula 3, M3 includes at least one of Zr, Al, Co, Mg, Mn, Si, Pd, Ni, Ti, Sn, Ir, Pt, and Ru, $1.9 \le a \le 2.1$, $0.9 \le b \le 1.1$, and $2.9 \le a \le 3.1$.

Referring to FIG. 1B, in the core 100 of the composite cathode active material 300, a grain boundary 20 has a substantially linear shape, e.g., a rectilinear shape. Since the plurality of primary particles 10 adjacent to the grain boundary 20 has a polyhedral shape due to the first lithium transition metal oxide having a layered crystal structure, the grain boundary 20 formed between adjacent primary particles 10 also has a linear, e.g., rectilinear, shape. Alternatively, the grain boundary 20 has, for example, a substantially curved or curvilinear shape. A radius of curvature of the curve is, for example, greater than 0 and less than about 1 m.

Referring to FIG. 1B, in the composite cathode active material 300, a grain boundary 20 is arranged, for example, in a direction 21 parallel to a surface of an adjacent primary particle 10. In addition, for example, the direction 21 in which the grain boundary 20 is arranged is different from a tangential direction 101 of the surface of the core 100 closest to the grain boundary 20.

Referring to FIG. 1B, in the composite cathode active material 300, the core 100 includes a first grain boundary 32 and a second grain boundary 33, the first grain boundary 32 and the second grain boundary 33 are located directly on the same primary particle 30, and the first grain boundary 32 and the second grain boundary 33 intersect at an angle (a) determined by the shape of the primary particle 30. The angle (a) at which the first grain boundary 32 and the second grain boundary 33 intersect is, for example, greater than 0° and less than about 180°, greater than about 10° and less than about 170°, greater than about 20° and less than about 160°, greater than about 30° and less than about 150°, greater than about 40° and less than about 140°, greater than about 50° and less than about 130°, greater than about 60° and less than about 120°, greater than about 70° and less than about 110°, or greater than about 80° and less than about 110°.

Referring to FIG. 1B, in the composite cathode active material 300, the core 100 includes a plurality of grain boundaries 32 and 42 respectively adjacent to a plurality of primary particles 30 and 40. The plurality of grain boundaries 32 and 42 are arranged in directions 31 and 41 respectively parallel to surfaces of the primary particles 30 and 40, respectively. The directions 31 and 41, in which the plurality of grain boundaries 32 and 42 are arranged, are different from each other.

Referring to FIG. 1B, the core 100 of the composite cathode active material 300 has an average grain boundary length of about 50 nm to about 1000 nm and an average grain boundary thickness of about 1 nm to about 200 nm. A length direction of the grain boundary refers to a direction parallel to the surface of each of the adjacent primary particles 20, 30, and 40, and a thickness direction of the grain boundary refers to a direction perpendicular to the surface of each of the primary particles 20, 30, and 40. The average grain boundary length is, for example, from about 50 nm to about 950 nm, from about 100 nm to about 900 nm, from about 150 nm to about 800 nm, or from about 200 nm to about 700 nm. The average grain boundary thickness is from about 2 nm to about 100 nm, from about 5 nm to about 100 nm, from about 10 nm to about 100 nm, or from about 20 nm to about 100 nm. When the average grain boundary length and the average grain boundary thickness are within the ranges above, the lithium battery including the composite cathode active material provides further improved cycle characteristics and thermal stability. The average grain boundary length is an average of lengths d1 of a grain boundary arranged in one direction. The average grain boundary thickness is an average of thicknesses d2 of a grain boundary arranged in one direction.

In the composite cathode active material, an average particle diameter of the primary particle is, for example, from about 50 nm to about 500 nm, from about 50 nm to about 450 nm, from about 50 nm to about 400 nm, from about 50 nm to about 350 nm, from about 50 nm to about 300 nm, from about 50 nm to about 250 nm, or from about 50 nm to about 200 nm. However, the average particle diameter of the primary particle is not limited to the ranges above and may be adjusted within a range providing improved cycle characteristics and thermal stability.

In the composite cathode active material, an average particle diameter of the core that is a secondary particle in which the primary particles aggregated is, for example, from about 1 μm to about 30 μm, from about 2 μm to about 28 μm, from about 4 μm to about 26 μm, from about 6 μm to about 24 μm, from about 8 μm to about 22 μm, from about 10 μm to about 20 μm, from about 12 μm to about 18 μm, from about 12 μm to about 16 μm, or from about 13 μm to about 15 μm. However, the average particle diameter of the core is not limited to the ranges above and may be adjusted within a range providing improved cycle characteristics and thermal stability.

In the composite cathode active material, the shell further includes, for example, the third composition including the second metal. The third composition may be added to the shell formed on the surface of the core in addition to the grain boundaries in the core. For example, the third composition included in the shell has the same composition or the same crystal structure as those of the third composition included in the grain boundary in the core. For example, the third composition included in the shell has a monoclinic crystal structure belonging to the C2/m, C12/c1, or C2/c space group. The third composition included in the shell has the composition represented by Formula 3 above.

In the composite cathode active material, the first lithium transition metal oxide is doped with the second metal. Since the first lithium transition metal oxide is doped with the second metal, structural stability of the first lithium transition metal oxide is improved.

In the composite cathode active material, the first lithium transition metal oxide may include lithium, nickel, the second metal, a third metal, and oxygen. The third metal refers to a metal other than lithium, nickel, and the second metal.

In the composite cathode active material, the first lithium transition metal oxide may include about 0.1 moles to about 1.3 moles of lithium per 1 mole of the first lithium transition metal oxide, about 0.7 moles to about 0.99 moles of nickel per 1 mole of the first lithium transition metal oxide, about 0.001 moles to about 0.01 moles of the second metal per 1 mole of the first lithium transition metal oxide, about 0.01 moles to about 0.3 moles of the third metal per 1 mole of the first lithium transition metal oxide, and about 1.7 moles to about 2.3 moles of oxygen per 1 mole of the first lithium transition metal oxide.

For example, the first lithium transition metal oxide is represented by Formula 4 below.

$$Li_aM4O_{2-\alpha}X_\alpha \qquad \text{Formula 4}$$

In Formula 4, $0.9 \le a \le 1.1$, $0 \le \alpha < 2$, M4 includes nickel, the second metal, and the third metal, wherein the third metal includes at least one element of elements of Groups 2 to 13 other than nickel and the second metal, an amount of nickel included in the M4 is from about 70 mol % to about 100 mol %, and X is at least one of F, S, and P. The first lithium transition metal oxide represented by Formula 4 includes the doped second metal.

For example, the first lithium transition metal oxide is represented by Formula 5 below.

$$Li_aNi_bM5_cM6_dM7_eO_{2-\alpha}X_\alpha \qquad \text{Formula 5}$$

In Formula 5, $0.9 \le a \le 1.1$, $0.7 < b < 1.0$, $0 < c < 0.3$, $0 < d < 0.3$, $0 \le e < 0.1$, $b+c+d+e=1$, $0 \le \alpha < 2$, M5, M6, and M7 are different from each other and each independently include at least one of cobalt (Co), manganese (Mn), zirconium (Zr), aluminum (Al), rhenium (Re), vanadium (V), chromium (Cr), iron (Fe), boron (B), ruthenium (Ru), titanium (Ti), niobium (Nb), molybdenum (Mo), magnesium (Mg), and platinum (Pt), and X is at least one of F, S, and P. The first lithium transition metal oxide represented by Formula 5 includes the doped second metal.

For example, the first lithium transition metal oxide is represented by Formula 6 or 7 below.

$$Li_aNi_bCo_cMn_dM8_eO_{2-\alpha}X_\alpha \quad \text{Formula 6}$$

$$Li_aNi_bCo_cAl_dM8_eO_{2-\alpha}X_\alpha \quad \text{Formula 7}$$

In Formulae 6 and 7, a, b, c, d, e, and α are independently 0.9≤a≤1.1, 0.7<b<1.0, 0<c<0.1, 0<d<0.1, 0≤e<0.01, b+c+d+e=1, 0≤α<2, M8 includes at least one of zirconium (Zr), aluminum (Al), vanadium (V), chromium (Cr), iron (Fe), rhenium (Re), boron (B), ruthenium (Ru), titanium (Ti), niobium (Nb), molybdenum (Mo), magnesium (Mg), and platinum (Pt), and X is at least one of F, S, and P. The first lithium transition metal oxide represented by Formula 6 or 7 includes the doped second metal.

In the composite cathode active material, the first lithium transition metal oxide includes at least one of a first layered structure crystal phase belonging to the C2/m space group and a second layered structure crystal phase belonging to the R-3m space group. For example, the first lithium transition metal oxide may be a composite of the first layered structure crystal phase and the second layered structure crystal phase.

For example, the first lithium transition metal oxide includes the first layered structure crystal phase having a composition represented by Formula 8a below and belonging to the C2/m space group and a second layered structure crystal phase having a composition represented by Formula 8b below and belonging to the R-3m space group.

$$Li_2MnO_3 \quad \text{Formula 8a}$$

$$LiMO_{2-\alpha}X_\alpha \quad \text{Formula 8b}$$

In Formulae 8a and 8b, M includes Ni and one or more elements of cobalt (Co), manganese (Mn), vanadium (V), chromium (Cr), iron (Fe), zirconium (Zr), rhenium (Re), aluminum (Al), boron (B), ruthenium (Ru), titanium (Ti), niobium (Nb), molybdenum (Mo), magnesium (Mg), and platinum (Pt), and X is at least one of F, S, and P, and 0≤α<2. An amount of Ni included in the M may be 70 mol % or more, or about 71 mol % to about 99 mol %, about 75 mol % to about 98 mol %, or about 78 mol % to about 90 mol %, based on a total transition metal content of the first layered structure crystal phase, or about 71 mol % to about 99 mol %, about 75 mol % to about 98 mol %, or about 78 mol % to about 90 mol %, based on a total transition metal content of the first lithium transition metal oxide. For example, the second layered structure crystal phase represented by Formula 8b includes the doped second metal.

For example, the first lithium transition metal oxide is represented by Formula 8c below.

$$aLi_2MnO_3 \cdot (1-a)LiMO_{2-\alpha}X_\alpha \quad \text{Formula 8c}$$

In Formula 8c, 0<a<1, 0≤α<2, M includes at least two elements of nickel (Ni), cobalt (Co), manganese (Mn), zirconium (Zr), aluminum (Al), rhenium (Re), vanadium (V), chromium (Cr), iron (Fe), boron (B), ruthenium (Ru), titanium (Ti), niobium (Nb), molybdenum (Mo), magnesium (Mg), and platinum (Pt), and X is at least one of F, S, and P. M may include at least Ni. An amount of Ni in the M may be 70 mol % or more, or about 71 mol % to about 99 mol %, about 75 mol % to about 98 mol %, or about 78 mol % to about 90 mol %, based on a total transition metal content of the first layered structure crystal phase, or about 71 mol % to about 99 mol %, about 75 mol % to about 98 mol %, or about 78 mol % to about 90 mol %, based on a total transition metal content of the first lithium transition metal oxide. The first lithium transition metal oxide represented by Formula 8c includes the doped second metal.

A cathode according includes the above-described composite cathode active material. Since the cathode includes the above-described composite cathode active material, cycle characteristics and thermal stability are improved.

For example, the cathode is prepared by the following exemplary method. However, the method is not limited thereto and may be adjusted.

First, the composite cathode active material, a conductive agent, a binder, and a solvent are mixed to prepare a cathode active material composition. The prepared cathode active material composition is directly coated on an aluminum current collector and dried to prepare a cathode plate having a cathode active material layer. Alternatively, the cathode active material composition is cast on a separate support, and a film separated from the support is laminated on an aluminum current collector to prepare a cathode plate having a cathode active material layer.

The conductive agent may be, but is not limited to, carbon black, graphite particulates, natural graphite, artificial graphite, acetylene black, Ketjen black, carbon fiber; carbon nanotubes; metal such as copper, nickel, aluminum, and silver each of which is used in powder, fiber, or tube form; or conductive polymers such as polyphenylene derivatives, and any suitable material for a conductive agent may also be used.

The binder may be a vinylidene fluoride/hexafluoropropylene copolymer, polyvinylidene fluoride, polyacrylonitrile, polymethylmethacrylate, polytetrafluoroethylene (PTFE), mixtures thereof, or a styrene butadiene rubber polymer, and the solvent may be N-methylpyrrolidone (NMP), acetone, or water. However, the binder and the solvent are not limited thereto and any suitable material for a binder and a solvent may also be used.

A plasticizer or a pore forming agent may further be added to the cathode active material composition to form pores inside the electrode plate.

Amounts of the composite cathode active material, the conductive agent, the binder, and the solvent used in the cathode are the same as those used in lithium batteries. At least one of the conductive agent, the binder, and the solvent may be omitted according to the use and configuration of the lithium battery.

Also, the cathode may further include an additional cathode active material in addition to the above-described composite cathode active material.

The additional cathode active material may be any suitable lithium-containing metal oxide. For example, at least one composite oxide of lithium and a metal of cobalt, manganese, nickel, and any suitable combination thereof may be used. For example, a compound represented by the following formulae: $Li_aA_{1-b}B'_bD_2$ (where 0.90≤a≤1 and 0≤b≤0.5); $Li_aE_{1-b}B'_bO_{2-c}D_c$ (where 0.90≤q≤1, 0≤b≤0.5, and 0≤c≤0.05); $LiE_{2-b}B'_bO_{4-c}D_c$ (where 0≤b≤0.5 and 0≤c≤0.05); $Li_aNi_{1-b-c}Co_bB'_cD_\alpha$ (where 0.90≤a≤1, 0≤b≤0.5, 0≤c≤0.05, and 0<α≤2); $Li_aNi_{1-b-c}Co_bB'_cO_{2-\alpha}F_\alpha$ (where 0.90≤a≤1, 0≤b≤0.5, 0≤c≤0.05, and 0<α<2); $Li_aNi_{1-b-c}Co_bB'_cO_{2-\alpha}F_2$ (where 0.90≤a≤1, 0≤b≤0.5, 0≤c≤0.05, and 0<α<2); $Li_aNi_{1-b-c}Mn_bB'_cD_\alpha$ (where 0.90≤a≤, 0≤b≤0.5, 0≤c≤0.05, and 0<α≤2); $Li_aNi_{1-b-c}Mn_bB'_cO_{2-\alpha}F_\alpha$ (where 0.90≤a≤1, 0≤b≤0.5, 0≤c≤0.05, and 0<α<2); $Li_aNi_{1-b-c}Mn_bB'_cO_{2-\alpha}F_2$ (where 0.90≤a≤1, 0≤b≤0.5, 0≤c≤0.05, and 0<α<2); $Li_aNi_bE_cG_dO_2$ (where 0.90≤a≤1, 0≤b≤0.9, 0≤c≤0.5, and 0.001≤d≤0.1); $Li_aNi_bCo_cMn_dGeO_2$ (where 0.90≤a≤1, 0≤b≤0.9, 0≤c≤0.5, 0≤d≤0.5, and 0.001≤e≤0.1); $Li_aNiG_bO_2$ (where 0.90≤a≤1 and 0.001≤b≤0.1); $Li_aCoG_bO_2$ (where 0.90≤a≤1 and 0.001≤b≤0.1); $Li_aMnG_bO_2$ (where 0.90≤a≤1 and 0.001≤v≤0.1); $Li_aMn_2G_bO_4$ (where 0.90≤a≤1 and 0.001≤b≤0.1); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (where 0≤f≤2); $Li_{(3-f)}Fe_2(PO_4)_3$ (where 0≤f≤2); and $LiFePO_4$.

In the formulae representing the above-described compounds, A is Ni, Co, Mn, or any combination thereof; B' is Al, Ni, Co, Mn, Cr, Fe, Mg, Sr, V, a rear earth element, or any combination thereof; D is O, F, S, P, or any combination thereof; E is Co, Mn, or any combination thereof; F' is F, S, P, or any combination thereof; G is Al, Cr, Mn, Fe, Mg, La, Ce, Sr, V, or any combination thereof; Q is Ti, Mo, Mn, or any combination thereof; I' is Cr, V, Fe, Sc, Y, or any combination thereof; and J is V, Cr, Mn, Co, Ni, Cu, or any combination thereof.

The above-described compound having a coating layer added to the surface thereof, or a mixture of the above-described compound and a compound having a coating layer may be used. The coating layer added to the surface of the above-described compound may include a compound of a coating element such as an oxide, hydroxide, oxyhydroxide, oxycarbonate, or hydroxycarbonate of the coating element. The compound constituting the coating layer is amorphous or crystalline. The coating element included in the coating layer may be Mg, Al, Co, K, Na, Ca, Si, Ti, V, Sn, Ge, Ga, B, As, Zr, or any mixture thereof. The coating layer may be formed by using any method which does not adversely affect physical properties of the cathode active material. Examples of the coating method include spray coating and immersing. The coating method is well known in the art, and thus detailed descriptions thereof will be omitted.

For example, the cathode includes the above-described composite cathode active material and an olivine-based cathode active material.

For example, the olivine-based cathode active material is represented by Formula 9 below.

$$Li_xM8_yM9_zPO_{4-\alpha}X_\alpha \quad \text{Formula 9}$$

In Formula 9, 0.90≤x≤1.1, 0≤y≤0.9, 0≤z≤0.5, 1−y−z≥0, 0≤α≤2, M8 includes at least one metal of Ti, V, Cr, Mn, Fe, Co, Ni, Cu, Al, Mg, Zr, and B, M9 includes at least one element of Mg, Ca, Sr, Ba, Ti, Zr, Nb, Mo, W, Zn, Al, Si, Ni, Mn, Cr, Fe, Mg, Sr, V, and a rear earth element, and X is at least one of F, S, and P.

Examples of the olivine-based cathode active material are $LiFePO_4$, $LiNiPO_4$, $LiMnPO_4$, $LiCoPO_4$, and the like.

For example, an amount of the olivine-based cathode active material included in cathode is about 10 weight percent (wt %) or less, about 9 wt % or less, about 8 wt % or less, about 7 wt % or less, about 6 wt % or less or about 5 wt % or less, based on a total weight of the cathode active material. For example, the amount of the olivine-based cathode active material included in the cathode is from about 1 wt % to about 10 wt %, from about 1 wt % to about 9 wt %, from about 1 wt % to about 8 wt %, from about 1 wt % to about 7 wt %, from about 1 wt % to about 6 wt %, or from about 1 wt % to about 5 wt %, based on the total weight of the cathode active material. For example, the amount of the olivine-based cathode active material included in cathode is from about 1 part by weight to about 10 parts by weight, from about 1 part by weight to about 9 parts by weight, from about 1 part by weight to about 8 parts by weight, from about 1 part by weight to about 7 parts by weight, from about 1 part by weight to about 6 parts by weight, or from about 1 part by weight to about 10 parts by weight, based on 100 parts by weight of the cathode active material. When the cathode further includes the olivine-based cathode active material within the ranges above, cycle characteristics and mixture density of the lithium battery are further improved.

A lithium battery according to another embodiment includes the cathode including the above-described composite cathode active material.

When the lithium battery includes the cathode including the above-described composite cathode active material, improved cycle characteristics and thermal stability are provided.

The lithium battery is manufactured, for example, by the following exemplary method. However, the method is not limited thereto and may be adjusted.

First, a cathode is prepared according to the above-described method of preparing a cathode.

Next, an anode is prepared as follows. For example, the anode is prepared in a method substantially the same as that used to prepare the cathode, except that an anode active material is used instead of the composite cathode active material. In addition, in an anode active material composition, a conductive agent, a binder, and a solvent substantially the same as those of the cathode may also be used.

For example, the anode active material, the conductive agent, the binder, and the solvent are mixed to prepare the anode active material composition, and the anode active material composition is directly coated on a copper current collector to prepare an anode plate. Alternatively, the prepared anode active material composition is cast on a separate support, and an anode active material film separated from the support is laminated on the copper current collector to prepare an anode plate.

The anode active material may be any suitable material used in the art as an anode active material of lithium batteries. For example, the anode active material includes lithium metal, a metal alloyable with lithium, a transition metal oxide, a non-transition metal oxide, and a carbonaceous material.

For example, the metal alloyable with lithium may be Si, Sn, Al, Ge, Pb, Bi, Sb, an Si—Y' alloy (where Y' is alkali metal, alkali earth metal, elements of Group 13, elements of Group 14, transition metal, rare earth elements, or any combination thereof, except for Si), an Sn—Y' alloy (where Y' is alkali metal, alkali earth metal, elements of Group 13, elements of Group 14, transition metal, rare earth elements, or any combination thereof, except for Sn). The element Y is, for example, Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or any combination thereof.

For example, the transition metal oxide is lithium titanium oxide, vanadium oxide, and lithium vanadium oxide.

For example, the non-transition metal oxide is $SnO_2$, $SiO_x$ (0<x<2), or the like.

For example, the carbonaceous material is crystalline carbon, amorphous carbon, or any mixture thereof. The crystalline carbon is, for example, graphite such as natural graphite or artificial graphite in amorphous, plate, flake, spherical or fibrous form. The amorphous carbon is, for example, soft carbon (carbon calcined at low temperature), hard carbon, mesophase pitch carbides, or calcined corks.

Amounts of the anode active material, the conductive agent, the binder, and the solvent are the same as those used in lithium batteries. At least one of the conductive agent, the binder, and the solvent may not be used according to the use and configuration of the lithium battery.

Subsequently, a separator to be interposed between the cathode and the anode is prepared.

Any suitable separator used in the art for lithium batteries may be used. For example, any separator having low resistance to ion migration of the electrolyte and excellent electrolyte-retaining ability may be used. For example, the separator may be of glass fiber, polyester, Teflon, polyethylene, polypropylene, polytetrafluoroethylene (PTFE), or any combination thereof, each of which is a non-woven or woven fabric. For example, a windable separator including polyethylene or polypropylene may be used in lithium ion batteries and a separator having excellent organic electrolyte-retaining capability may be used in lithium-ion polymer batteries.

The separator is prepared according to the following exemplary method. However, the method is not limited thereto and may be adjusted.

First, a polymer resin, a filler, and a solvent are mixed to prepare a separator composition. The separator composition is directly coated on an electrode and dried to prepare a separator. Alternatively, the separator composition is cast on a support and dried and then a separator film separated from the support is laminated on an electrode to form a separator.

The polymer used to prepare the separator is not particularly limited and any suitable polymer used as a binder for electrode plates may also be used. For example, a vinylidene fluoride/hexafluoropropylene copolymer, a polyvinylidenefluoride (PVDF), polyacrylonitrile, polymethylmethacrylate, or any mixture thereof may be used.

Subsequently, an electrolyte is prepared.

For example, the electrolyte may be an organic electrolytic solution. The electrolytic solution is prepared, for example, by dissolving a lithium salt in an organic solvent.

Any suitable organic solvent used in the art may be used. For example, the organic solvent is propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxorane, 4-methyldioxorane, N,N-dimethyl formamide, dimethyl acetamide, dimethylsulfoxide, dioxane, 1,2-dimethoxyethane, sulfolane, dichloroethane, chlorobenzene, nitrobenzene, diethylene glycol, dimethyl ether, or any mixture thereof.

The lithium salt may also be any suitable lithium salt used in the art. For example, the lithium salt is $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (where x and y are natural numbers), LiCl, LiI or any mixture thereof.

Alternatively, the electrolyte may be a solid electrolyte. For example, the solid electrolyte is boron oxide, lithium oxynitride, or the like. However, the solid electrolyte is not limited thereto and any known solid electrolyte may be used. The solid electrolyte may be formed on the anode by sputtering, or the like or a separate solid electrolyte sheet may be laminated on the anode.

Figure 6:
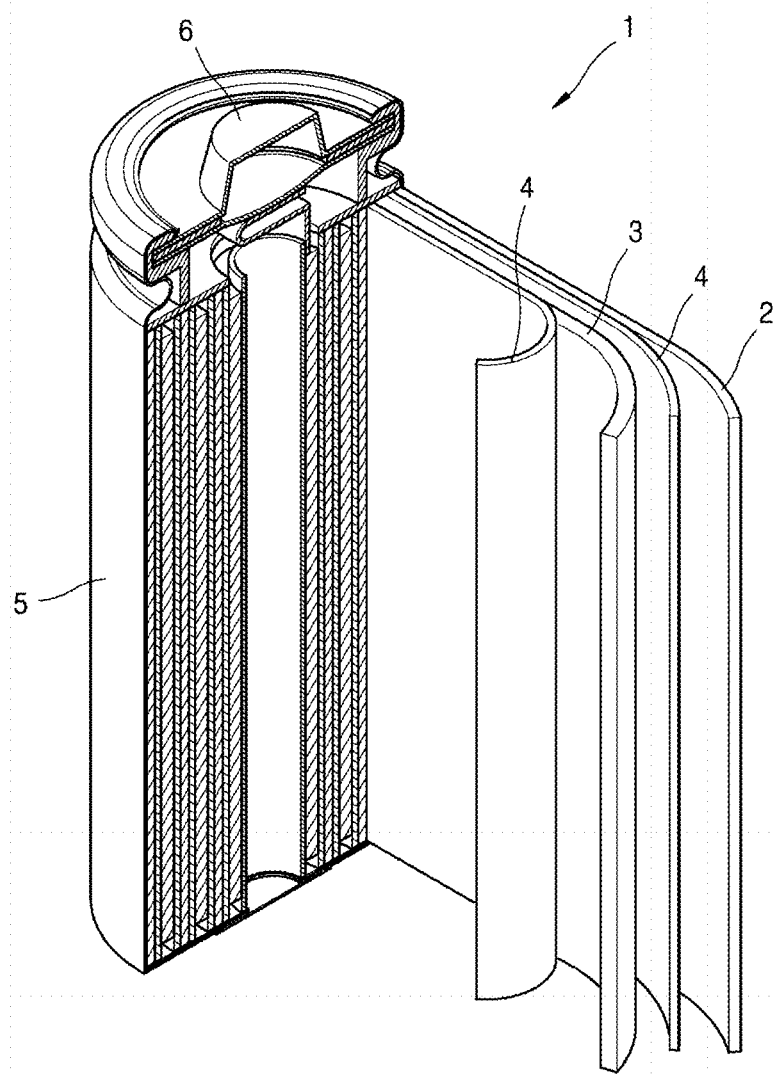
FIG. 6 is a schematic diagram of a lithium battery according to an embodiment.

As shown in FIG. 6, a lithium battery 1 includes a cathode 3, an anode 2, and a separator 4. The cathode 3, the anode 2, and the separator 4 may be wound or folded and then accommodated in a battery case 5. An organic electrolytic solution is injected into the battery case 5 and the battery case 5 is sealed by a cap assembly 6, thereby completing the manufacture of the lithium battery 1. The battery case 5 may have a cylindrical shape. However, the shape of the battery case 5 is not limited thereto and a rectangular shape or a thin-film shape may also be used.

A pouch type lithium battery includes at least one battery assembly. The separator is interposed between the cathode and the anode to form a battery assembly. The battery assembly is stacked in a bi-cell structure, impregnated with the organic electrolytic solution, accommodated in a pouch, and sealed to complete the manufacture of the pouch type lithium battery. A plurality of battery assemblies may be stacked to form a battery pack, which may be used in any device that benefits from high capacity and output power, such as, notebook computers, smartphones, and electric vehicles.

Due to excellent lifespan characteristics and high rate properties, lithium batteries are used in, for example, electric vehicles (EVs). For example, lithium batteries are used in hybrid vehicles such as plug-in hybrid electric vehicles (PHEVs). Also, lithium batteries are used in, for example, E-bikes and electric tools.

A method of preparing a composite cathode active material comprises: providing, e.g., preparing, a first lithium transition metal oxide; mixing the first lithium transition metal oxide with a first metal precursor to prepare a first composition; mixing the first composition of the first lithium transition metal oxide with a P-precursor comprising phosphorous to preparing a second composition; drying the second composition; and heat-treating the dried second composition at a temperature of about 400° C. to about 1000° C. under an oxidizing atmosphere to prepare the composite cathode active material.

For example, the preparing of the first composition and the preparing of the second composition may be performed by a wet process using a solvent. The first composition and the second composition include a solvent dissolving the first metal precursor and the P-precursor, respectively and any suitable solvent used in the art may be used, without limitation. For example, the solvent is distilled water.

The first metal precursor may be a nitrate, oxychloride, oxynitrate of the first metal. However, the first metal precursor is not limited thereto and may be any suitable dissociating salt including the first metal and used in the art. Examples of the first metal precursor include $Co(NO_3)_2 \cdot 6H_2O$ and $Mg(NO_3)_2 \cdot 6H_2O$. In the first composition, for example, a hydroxide form of the first metal is deposited on the surface of the first lithium transition metal oxide. Examples of the hydroxide form of the first metal include $Co(OH)_2$ and $Mg(OH)_2$.

The P-precursor may be a phosphate of metal or ammonium. However, the P-precursor is not limited thereto and may be any suitable dissociating salt including phosphorus (P) and used in the art. Examples of the P-precursor include $(NH_4)_2HPO_4$ and $(NH_4)_3PO_4$. In the second composition, a precursor of the second composition is deposited on the first lithium transition metal oxide.

The oxidizing atmosphere may be an atmosphere including oxygen or air. The oxidizing atmosphere includes oxygen, air, or any combination thereof, e.g., air having an increased amount of oxygen.

In the first composition, an amount of the first metal precursor may be about 30 parts by weight or less, about 20 parts by weight or less, or about 10 parts by weight or less based on 100 parts by weight of the first lithium transition metal oxide. In the first composition, an amount of the solvent may be 300 parts by weight or less, 200 parts by weight or less, or 100 parts by weight or less based on 100 parts by weight of the first lithium transition metal oxide. In the second composition, an amount of the P-precursor may be 30 parts by weight or less, 20 parts by weight or less, or 10 parts by weight or less based on 100 parts by weight of the first lithium transition metal oxide. In the second composition, an amount of the solvent may be 300 parts by weight or less, 200 parts by weight or less, or 100 parts by weight or less based on 100 parts by weight of the first lithium transition metal oxide.

For example, the heat treatment is performed at a temperature of about 400° C. to about 1000° C., from about 500° C. to about 900° C., from about 600° C. to about 800° C., or from about 700° C. to about 750° C. A heat treatment time is, for example, from about 3 hours to about 20 hours, from about 3 hours to about 15 hours, from about 3 hours to about 10 hours, from about 3 hours to about 7 hours, or from about 4 hours to about 6 hours. A heating rate to reach the heat treatment temperature is, for example, from about 1° C./min to about 10° C./min. When the heat treatment temperature, heat treatment time, and heating rate are within the above-described ranges, the shell including the first layer formed on the core and the second layer formed on the first layer is prepared.

In the method of preparing the composite cathode active material, the preparing of the first lithium transition metal oxide includes: preparing a precursor mixture of a precursor of the first lithium transition metal oxide and a second metal precursor; and heat-treating the mixture at a temperature of about 400° C. to about 1000° C. under an oxidizing atmosphere to prepare the first lithium transition metal oxide.

For example, the preparing of the mixture is performed by a dry process without using a solvent. The mixture may be a dry powder obtained by mixing a powder of the precursor of the first lithium transition metal oxide and a powder of the second metal precursor. Alternatively, the preparing of the mixture is performed by a wet process using a solvent. The mixture includes a solvent dissolving the precursor of the first lithium transition metal oxide and the second metal precursor and any known solvent may be used, without limitation. For example, the solvent is distilled water. By the wet process, the third composition including the second metal is more densely included in the grain boundary between the primary particles.

The oxidizing atmosphere refers to an atmosphere including oxygen or air. The oxidizing atmosphere includes oxygen, air, or any combination thereof, e.g., air having an increased amount of oxygen.

The second metal precursor may be an oxide or hydroxide of the second metal. However, the second metal precursor is not limited thereto and may be any material including the second metal and used in the art. Examples of the second metal precursor include $ZrO_2$ and $Al_2O_3$.

In the mixture, an amount of the second metal precursor is 30 parts by weight or less, 20 parts by weight or less, or 10 parts by weight or less based on 100 parts by weight of the precursor of the first lithium transition metal oxide.

The heat treatment is performed, for example, at a temperature of about 400° C. to about 1000° C., from about 500° C. to about 900° C., from about 600° C. to about 800° C., or from about 700° C. to about 750° C. A heat treatment time is, for example, from about 3 hours to about 20 hours, from about 3 hours to about 15 hours, from about 3 hours to about 10 hours, from about 3 hours to about 7 hours, or from about 4 hours to about 6 hours. A heating rate to reach the heat treatment temperature is, for example, from about 1° C./min to about 10° C./min. When the heat treatment temperature, heat treatment time, and heating rate are within the above-described ranges, a third composition including a second metal is formed in the grain boundary between the primary particles and the first lithium transition metal oxide is doped with the second metal.

Hereinafter, an embodiment will be described in detail with reference to the following examples and comparative examples. However, these examples and comparative examples are not intended to limit the purpose and scope of the one or more embodiments.

EXAMPLES

Preparation of Composite Cathode Active Material

Example 1: Ni88+Al—Zr Doping, $Li_2ZrO_3$ Grain Boundary Coating+Co/Mg:P=0.25 wt %:0.25 wt %, and Double-Layered Coating Preparation of Core Zirconium oxide ($ZrO_2$) and alumina ($Al_2O_3$) as second metal precursors, $Ni_{0.88}Co_{0.08}Mn_{0.04}(OH)_2$ as a first lithium transition metal oxide precursor, and $LiOH \cdot H_2O$ as a lithium precursor were mixed in a molar ratio to obtain a core having the following composition. $Ni_{0.88}Co_{0.08}Mn_{0.04}(OH)_2$ and the lithium precursor of $LiOH \cdot H_2O$ were mixed in a molar ratio of 1:1.09. The mixture was placed in a furnace and subjected to a primary heat treatment at 720° C. for 5 hours while flowing oxygen to prepare a core.

From the primary heat treatment, a $Li(Ni_{0.88}Co_{0.08}Mn_{0.04})_{1-x-y}Al_xZr_yO_2$ core (where x=0.001 and y=0.0025) doped with A and Zr was obtained as a first lithium transition metal oxide.

Also, an $Li_2ZrO_3$ coating layer having a monoclinic crystal structure was formed on the surface of the core (i.e., a polycrystalline secondary particle) and in a grain boundary located between a plurality of primary particles.

Shell Preparation

A precursor was prepared by mixing $Co(NO_3)_2 \cdot 6H_2O$ and $Mg(NO_3)_2 \cdot 6H_2O$ in a molar ratio of 3:2 such that a sum of amounts of Co and Mg was 0.25 parts by weight based on 100 parts by weight of the first lithium transition metal oxide in a first layer of a composite cathode active material. The precursor was added to 10 parts by weight of distilled water and stirred at room temperature (25° C.) for 1 minute to prepare a first aqueous solution.

$NH_4H_2PO_4$ was prepared such that an amount of P was 0.25 parts by weight based on 100 parts by weight of the first lithium transition metal oxide in a second layer of the composite cathode active material, and then added to 10 parts by weight of distilled water and stirred at room temperature (25° C.) for 1 minute to prepare a second aqueous solution.

100 parts by weight of powder of the $Li(Ni_{0.88}Co_{0.08}Mn_{0.04})_{1-x-y}Al_xZr_yO_2$ core (where x=0.001 and y=0.0025) was added to 90 parts by weight of distilled water to prepare a third aqueous solution. The first aqueous solution and the second aqueous solution were sequentially added to the third aqueous solution while stirring at room temperature for 10 minutes to prepare a mixture.

The mixture was dried in an oven at 150° C. for 15 hours to prepare a dried product.

The dried product was added to a furnace and heat-treated at 720° C. for 5 hours while flowing oxygen to prepare a composite cathode active material.

A first layer including $Co_3O_4$ and MgO was formed on the surface of the $Li(Ni_{0.88}Co_{0.08}Mn_{0.04})_{1-x-y}Al_xZr_yO_2$ core (where x=0.001 and y=0.0025) and the second layer including $Li_xCoPO_4$ (where 0<x<2), $Li_3PO_4$, and $Co_3(PO_4)_2$ was formed on the first layer.

A sum of the amounts of Co and Mg contained in the first layer was 0.25 parts by weight based on 100 parts by weight of the first lithium transition metal oxide, and the amount of P contained in the second layer was 0.25 parts by weight based on 100 parts by weight of the first lithium transition metal oxide.

Example 2: Ni88+Al—Zr Doping, $Li_2ZrO_3$ Grain Boundary Coating+Co/Mg:P=0.50 wt %:0.25 wt %, and Double-Layered Coating A composite cathode active material was prepared in the same manner as in Example 1, except that $Co(NO_3)_2 \cdot 6H_2O$ and $Mg(NO_3)_2 \cdot 6H_2O$ were mixed in a molar ratio of 3:2 such that the sum of the amounts of Co and Mg was 0.5 parts by weight based on 100 parts by weight of the first lithium transition metal oxide in the first layer of the composite cathode active material.

The sum of the amounts of Co and Mg contained in the first layer was 0.5 parts by weight based on 100 parts by weight of the first lithium transition metal oxide, and the amount of P contained in the second layer was 0.25 parts by weight based on 100 parts by weight of the first lithium transition metal oxide.

Example 3: Ni88+Al—Zr Doping, $Li_2ZrO_3$ Grain Boundary Coating+Co/Mg:P=0.75 wt %:0.25 wt %, and Double-Layered Coating A composite cathode active material was prepared in the same manner as in Example 1, except that $Co(NO_3)_2 \cdot 6H_2O$ and $Mg(NO_3)_2 \cdot 6H_2O$ were mixed in a molar ratio of 3:2 such that the sum of the amounts of Co and Mg was 0.75 parts by weight based on 100 parts by weight of the first lithium transition metal oxide in the first layer of the composite cathode active material.

The sum of the amounts of Co and Mg contained in the first layer was 0.75 parts by weight based on 100 parts by weight of the first lithium transition metal oxide, and the amount of P contained in the second layer was 0.25 parts by weight based on 100 parts by weight of the first lithium transition metal oxide.

Example 4: Ni88+Al Doping (NoZr)+Co/Mg:P=0.25 wt %:0.25 wt %, and Double-Layered Coating A composite cathode active material was prepared in the same manner as in Example 1, except that alumina ($Al_2O_3$) was used as a second metal precursor without using zirconium oxide ($ZrO_2$) in the preparation of the core.

By primary heat treatment, an Al-doped $Li(Ni_{0.88}Co_{0.08}Mn_{0.04})_{1-x}Al_xO_2$ core (where x=0.001) was obtained.

A sum of the amounts of Co and Mg contained in the first layer was 0.25 parts by weight based on 100 parts by weight of the first lithium transition metal oxide, and the amount of P contained in the second layer was 0.25 parts by weight based on 100 parts by weight of the first lithium transition metal oxide.

Comparative Example 1: Ni88 Core

The powder of the $Li(Ni_{0.88}Co_{0.08}Mn_{0.04})_{1-x-y}Al_xZr_yO_2$ core (where x=0.001 and y=0.0025) prepared in the primary heat treatment of Example 1 was used.

Comparative Example 2: Ni88 Core+Washing

After adding 100 parts by weight of powder of the $Li(Ni_{0.88}Co_{0.08}Mn_{0.04})_{1-x-y}Al_xZr_yO_2$ core (where x=0.001 and y=0.0025) prepared in the primary heat treatment of Example 1 to 90 parts by weight of distilled water and stirring the mixture, a washing process was performed once by filtering and separating a precipitate to remove residual lithium.

The separated precipitate was dried in an oven at 150° C. for 15 hours to prepare a dried product.

The dried product was added to a furnace and heat-treated at 720° C. for 5 hours while flowing oxygen to prepare a composite cathode active material.

Comparative Example 3: Ni88+Al—Zr Doping, $Li_2ZrO_3$ Grain Boundary Coating+Co/Mg:P=0.75 wt %:0.0 wt %, and Single-Layered Coating A composite cathode active material was prepared in the same manner as Example 1, except that $Co(NO_3)_2 \cdot 6H_2O$ and $Mg(NO_3)_2 \cdot 6H_2O$ were mixed in a molar ratio of 3:2 such that the sum of the amounts of Co and Mg was 0.75 parts by weight based on 100 parts by weight of the first lithium transition metal oxide in the first layer of the composite cathode active material and the second aqueous solution including $NH_4H_2PO_4$ was not added in the preparation of the shell.

A first layer including $Co_3O_4$ and MgO was formed on the surface of the $Li(Ni_{0.88}Co_{0.08}Mn_{0.04})_{1-x-y}Al_xZr_yO_2$ core (where x=0.001 and y=0.0025). The second layer was not formed.

The sum of the amounts of Co and Mg was 0.75 parts by weight based on 100 parts by weight of the first lithium transition metal oxide.

Comparative Example 4: Ni88+Al—Zr Doping, $Li_2ZrO_3$ Grain Boundary Coating+Co/Mg:P=0.25 wt %:0.25 wt %, Single-Layered Composite Coating A composite cathode active material was prepared in the same manner as in Example 1, except that the first aqueous solution and the second aqueous solution were simultaneously added to the third aqueous solution in the preparation of the shell.

A composite layer including Co, Mn, and P was formed on the surface of the $Li(Ni_{0.88}Co_{0.08}Mn_{0.04})_{1-x-y}Al_xZr_yO_2$ core (where x=0.001 and y=0.0025).

The sum of the amounts of Co and Mg was 0.25 parts by weight based on 100 parts by weight of the first lithium transition metal oxide and the amount of P was 0.25 parts by weight based on 100 parts by weight of the first lithium transition metal oxide in the first layer.

Reference Example 1: Ni88+Al—Zr Doping, $Li_2ZrO_3$ Grain Boundary Coating+Co/Mg:P=0.25 wt %:0.0 wt %, and Single-Layered Coating A composite cathode active material was prepared in the same manner in Example 1, except that the second aqueous solution including $NH_4H_2PO_4$ was not added in the preparation of the shell.

A first layer including $Co_3O_4$ and MgO was formed on the surface of the $Li(Ni_{0.88}Co_{0.08}Mn_{0.04})_{1-x-y}Al_xZr_yO_2$ core (where x=0.001 and y=0.0025). The second layer was not formed.

The sum of the amounts of Co and Mg was 0.25 parts by weight based on 100 parts by weight of the first lithium transition metal oxide in the first layer. This configuration was prepared by removing the second layer from the composite cathode active material according to Example 1 for comparison with Example 1.

Preparation of Lithium Battery (Half Cell)

Example 5

Preparation of Cathode

The composite cathode active material prepared according to Example 1, a carbon conductive agent (Denka Black), and polyvinylidene fluoride (PVdF) were mixed in a weight ratio of 92:4:4 to prepare a mixture and the mixture was mixed with N-methylpyrrolidone (NMP) in an agate mortar to prepare a slurry. The slurry was applied to a 15 μm-thick aluminum current collector by bar-coating, and the slurry was dried at room temperature, further dried in a vacuum at 120° C., roll-pressed, and punched to prepare a cathode plate having a thickness of 55 μm.

Preparation of Coin Cell

A coin cell was prepared using the prepared cathode plate, lithium metal as a counter electrode, a PTFE separator, and an electrolyte, which is prepared by dissolving 1.15 M $LiPF_6$ in a mixed solvent of ethylene carbonate (EC), ethylmethyl carbonate (EMC), dimethyl carbonate (DMC) (in a volume ratio of 3:4:3).

Examples 6 to 8

Coin cells were prepared in the same manner as in Example 5, except that the composite cathode active materials respectively prepared according to Examples 2 to 4 were used instead of the composite cathode active material prepared according to Example 1.

Example 9: Addition of LFP

A coin cell was prepared in the same manner as in Example 5, except that 5 parts by weight of $LiFePO_4$ (LFP) was added to 100 parts by weight of the composite cathode active material prepared according to Example 1.

Comparative Examples 5 to 8

Coin cells were prepared in the same manner as in Example 5, except that the composite cathode active materials respectively prepared according to Comparative Examples 1 to 4 were used instead of the composite cathode active material prepared according to Example 1.

Preparation of Lithium Battery (Full Cell)

Example 10

Preparation of Cathode

The composite cathode active material prepared according to Example 1, a carbon conductive agent (Denka Black), and polyvinylidene fluoride (PVdF) were mixed in a weight ratio of 92:4:4 and the mixture was mixed with N-methylpyrrolidone (NMP) in an agate mortar to prepare a cathode active material slurry. The slurry was applied to a 15 μm-thick aluminum current collector by bar-coating, and the coated slurry was dried at room temperature, further dried in a vacuum at 120° C., roll-pressed, and punched to prepare a cathode plate having a thickness of 55 μm.

Preparation of Anode

Graphite particles having an average particle diameter of 25 μm, a styrene-butadiene rubber (SBR) binder (ZEON), and carboxymethyl cellulose (CMC, NIPPON A&L) were mixed in a weight ratio of 97:1.5:1.5, and the mixture was added to distilled water and stirred using a mechanical stirrer for 60 minutes to prepare an anode active material slurry. The slurry was applied to a 10 μm-thick copper current collector using a doctor blade, and the slurry was dried in a hot-air dryer at 100° C. for 0.5 hours, further dried in a vacuum at 120° C. for 4 hours, roll-pressed, and punched to prepare an anode plate having a thickness of 65 μm.

Preparation of Coin Cell

The cathode plate and the anode plate prepared as described above, the PTFE separator, and the electrolyte prepared by dissolving 1.15 M $LiPF_6$ in a mixed solvent of EC, EMC, and DMC (in a volume ratio of 3:4:3) were used to prepare a coin cell.

Examples 11 to 13

Coin cells were prepared in the same manner as in Example 10, except that the composite cathode active materials respectively prepared according to Examples 2 to 4 were used instead of the composite cathode active material prepared according to Example 1.

Example 14: Addition of LFP

A coin cell was prepared in the same manner as in Example 10, except that 5 parts by weight of $LiFePO_4$ was added to 100 parts by weight of the composite cathode active material prepared according to Example 1.

Comparative Example 9 to 12

Coin cells were prepared in the same manner as in Example 10, except that the composite cathode active materials respectively prepared according to Comparative Examples 1 to 4 were respectively used instead of the composite cathode active material prepared according to Example 1.

Evaluation Example 1: Evaluation of XRD Spectrum

Figure 2A:
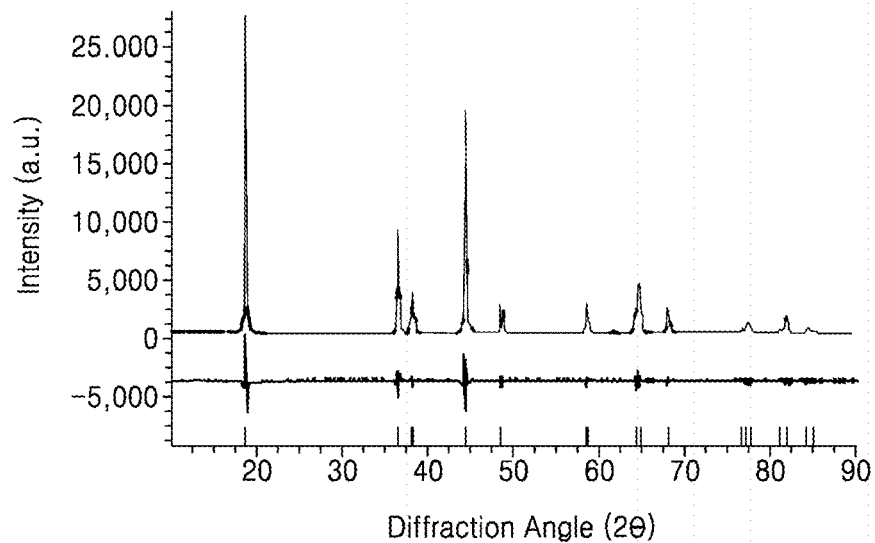
FIGS. 2A and 2B are each a graph of intensity (arbitrary units, a.u.) versus diffraction angle (degrees 2θ) showing the results of X-ray diffraction (XRD) analysis of composite cathode active materials prepared according to Reference Example 1 and Example 1, respectively.
Figure 2B:
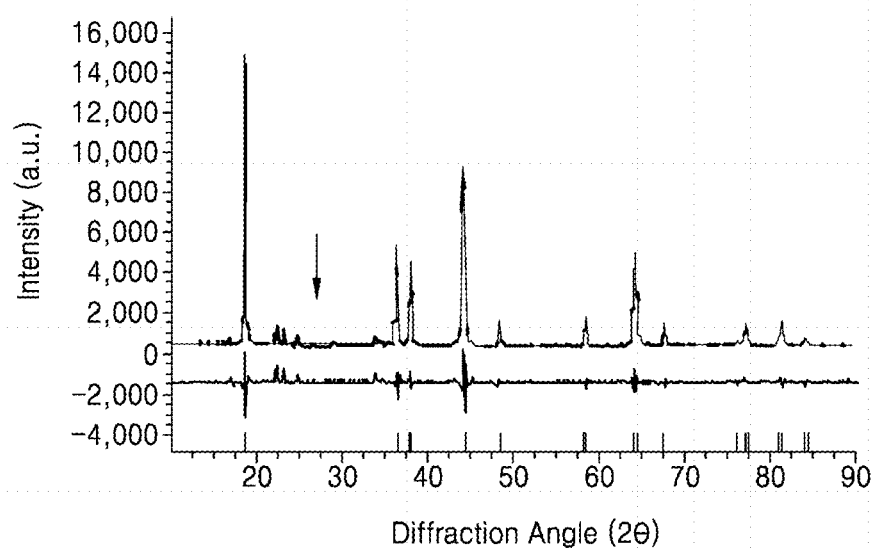

X-ray diffraction (XRD) spectra of the composite cathode active materials prepared according to Reference Example 1 and Example 1 were obtained and the results are shown in FIGS. 2A and 2B, respectively. Cu Kα radiation was used to obtain the XRD spectra.

As shown in FIG. 2A, only a peak indicating a phase having a layered crystal structure belonging to the R-3m space group was observed in the XRD spectrum of the composite cathode active material according to Reference Example 1 in which only the first layer is formed as the coating layer. Thus, it was confirmed that the composition including the first layer had a first phase with a layered crystal structure belonging to the R-3m space group.

As shown in FIG. 2B, additional peaks were observed at a diffraction angle (2θ) of about 20° to about 35°, in addition to the peak indicating the layered crystal structure, in the XRD spectrum of the composite cathode active material according to Example 1 in which the second layer is additionally formed on the first layer as the coating layer. Therefore, it was confirmed that the second phase structurally distinguished from the first phase included in the first layer was additionally formed.

Via Reitveld analysis, it was confirmed that the first layer includes a $Co_3O_4$ phase and a MgO phase and the second layer includes an $Li_3PO_4$ phase, an $Li_aCo_b(PO_4)_c$ phase (where $0.5<a<1.5$, $0.9<b<1.5$, and $0.9<c<1.5$), and a $Co_3(PO_4)_2$ phase.

Evaluation Example 2: Composition Evaluation of Inside and Surface of Core

Figure 3A:
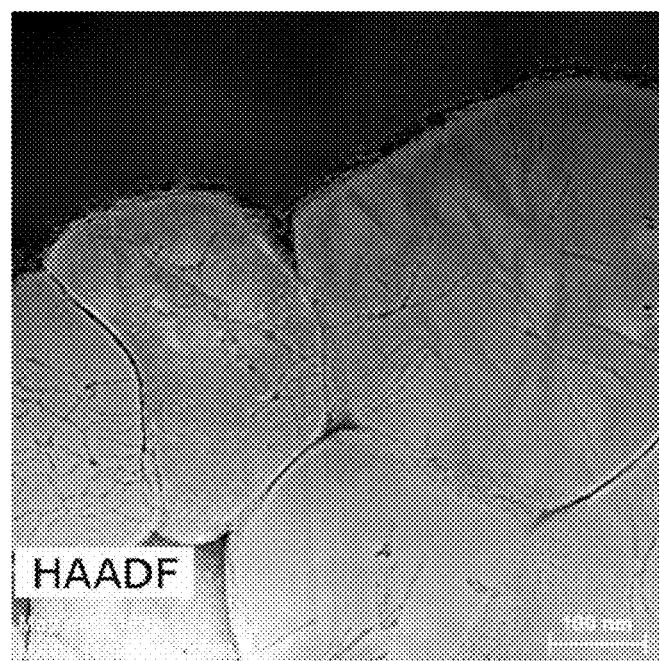
FIG. 3A is a high-angle annular dark field (HAADF) scanning transmission electron microscopy (STEM) image of a cross-section of a composite cathode active material prepared according to Reference Example 1.
Figure 3B:
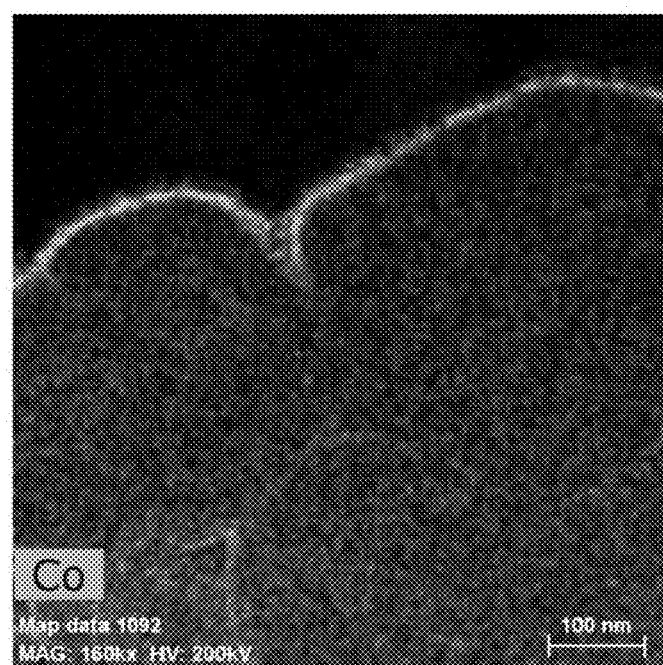
FIGS. 3B and 3C are energy dispersive X-ray spectroscopy (EDS) images of the cross-section of a composite cathode active material prepared according to Reference Example 1 and shown in FIG. 3A.
Figure 3C:
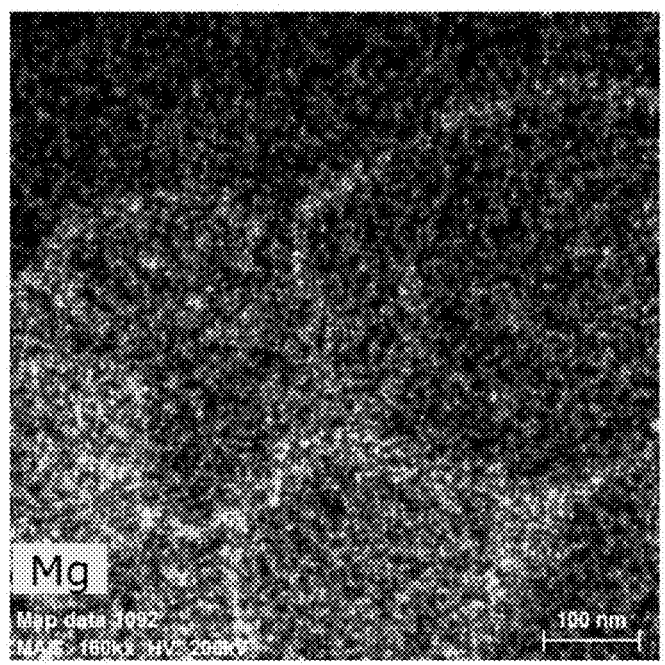

FIGS. 3A to 3C are a high-angle annular dark field (HAADF) scanning transmission electron microscopy (STEM) image and energy dispersive X-ray spectroscopy (EDS) images of a cross-section of a composite cathode active material prepared according to Reference Example 1 including the core, as a secondary particle in which a plurality of primary particles are aggregated, and the first layer formed on the core.

FIGS. 4A to 4D are an HAADF STEM image and EDS images of a cross-section of a composite cathode active material prepared according to Example 1 including the core, as a secondary particle in which a plurality of primary particles are aggregated, and the first layer and the second layer each formed on the core.

As shown in FIGS. 3A to 3C, it was confirmed that the first layer including Co and Mg was formed on the core.

It was also confirmed that concentrations of Co and/or Mg included in the first layer were higher than those of Co and/or Mg included in the primary particles. Referring to FIGS. 3B and 3C, the higher concentration of a metal is, the brighter the color corresponding to the metal is. That is, it was confirmed that a coating layer including high concentrations of Co and Mg was formed on the primary particles included in the core.

As shown in FIGS. 4A to 4D, it was confirmed that the second layer including Co and P was formed on the first layer. Although not shown in the drawings, it was also confirmed that the second layer had a mixed phase including Li, Co, P, and O.

Figure 4A:
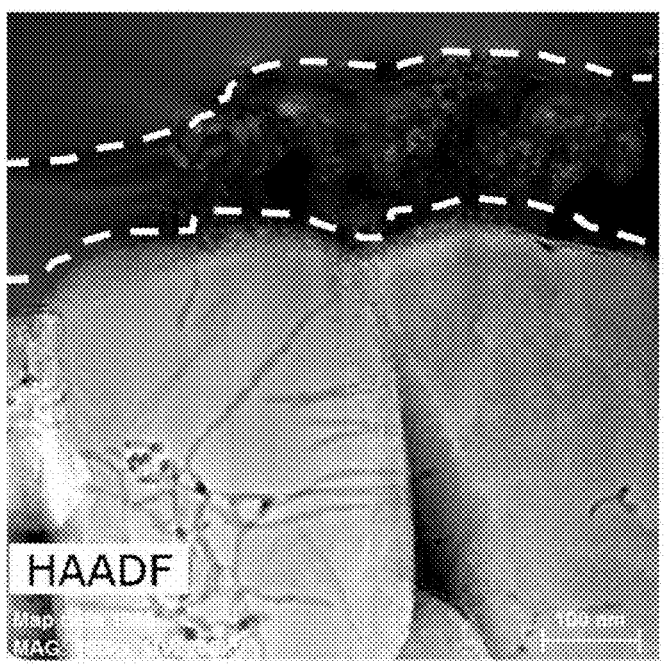
FIG. 4A is a HAADF STEM image of a cross-section of a composite cathode active material prepared according to Example 1.
Figure 4B:
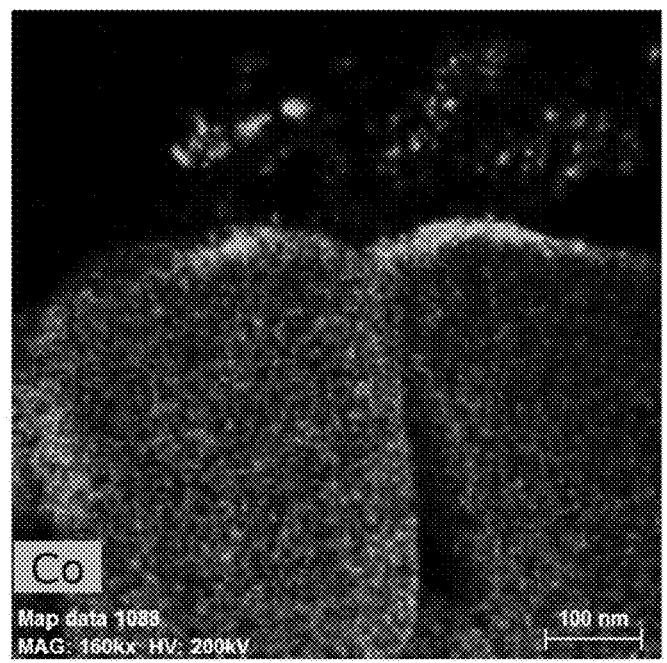
FIGS. 4B to 4D are EDS images of the cross-section of a composite cathode active material prepared according to Example 1 and shown in FIG. 4A.
Figure 4C:
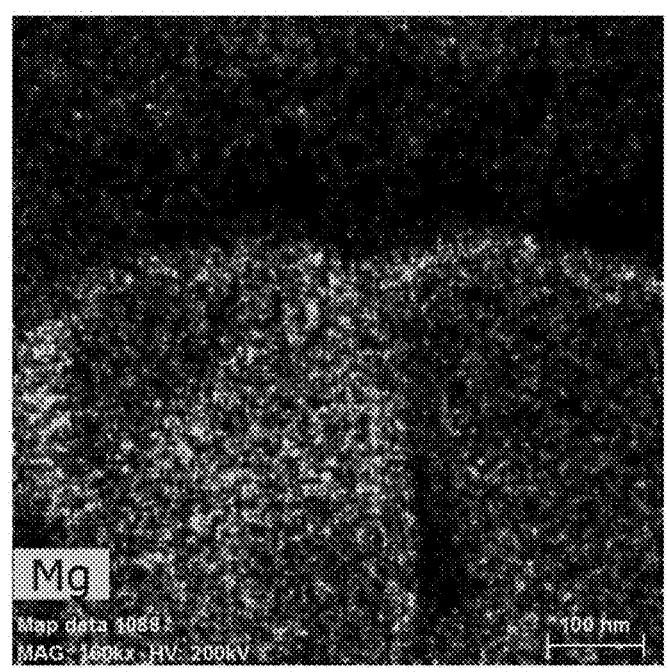
Figure 4D:
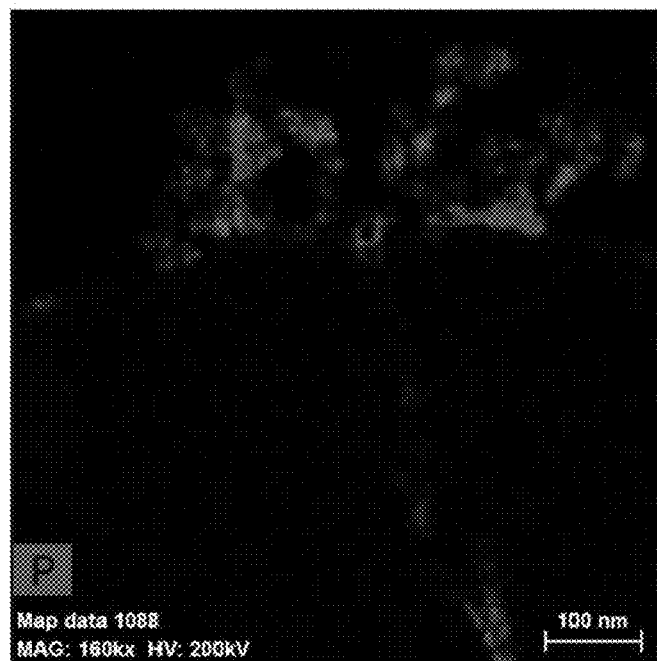

As shown in FIGS. 4A and 4B, the thickness of the second layer was greater than that of the first layer. The thickness of the first layer was about 20 nm, and the thickness of the second layer was about 100 nm.

Although not shown in the drawings, it was confirmed that a separate phase including Zr was formed in a grain boundary located between primary particles included in the core and on the surface of the core (i.e. a polycrystalline secondary particle) via an additional high-resolution analysis. The separate phase was an $Li_2ZrO_3$ phase having a monoclinic crystal structure belonging to the C2/m space group.

Evaluation Example 3: Evaluation of Amount of Residual Lithium

Amounts of surface residual lithium of the composite cathode active materials prepared according to Comparative Examples 1 to 3 and Example 1 were measured and some of the results are shown in Table 1 below.

The amounts of surface residual lithium were evaluated by measuring amounts of Li of $Li_2CO_3$ and LiOH remaining on the surfaces of the composite cathode active materials using a wet method (or a titration method).

Specifically, a method disclosed in paragraph [0054] of Japanese Patent Laid-Open Publication No. 2016-081903, the content of which is incorporated herein by reference in its entirety, may be referred to.

TABLE 1

| | Amount of residual lithium [ppm] |
|---|---|
| Comparative Example 1 | 6723 |
| Comparative Example 2 | 1160 |
| Comparative Example 3 | 1189 |
| Example 1 | 1142 |

As shown in Table 1, an amount of residual lithium on the surface of the composite cathode active material according to Example 1 was reduced when compared with those of residual lithium on the surfaces of the composite cathode active materials according to Comparative Examples 1 to 3.

It is considered that lithium remaining on the first lithium transition metal oxide sequentially reacted with the precursor of the first composition and the precursor of the second composition, thereby forming a multi-layered coating layer on the core.

Thus, since gas generation is inhibited and side reactions with the electrolytic solution are prevented during charging and discharging of the lithium battery including the composite cathode active material according to Example 1, the lithium battery may have improved lifespan characteristics when compared with the lithium batteries respectively including the composite cathode active materials according to Comparative Examples 1 to 3.

Evaluation Example 4: DSC Measurement of Composite Cathode Active Material

Thermograms of the composite cathode active materials prepared according to Example 1 and Comparative Example 3 were obtained using a differential scanning calorimeter (DSC) from 30° C. to 350° C., and the results are shown in Table 2 and FIG. 5 below.

TABLE 2

| | Amount of heat generation [J/g] |
|---|---|
| Example 1 | 1776 |
| Comparative Example 3 | 2137 |

As shown in Table 2, an amount of heat generated in the composite cathode active material according to Example 1 having the multi-layered coating layer was reduced when compared with that of heat generated in the composite cathode active material according to Comparative Example 3 having a single-layered coating layer.

Figure 5:
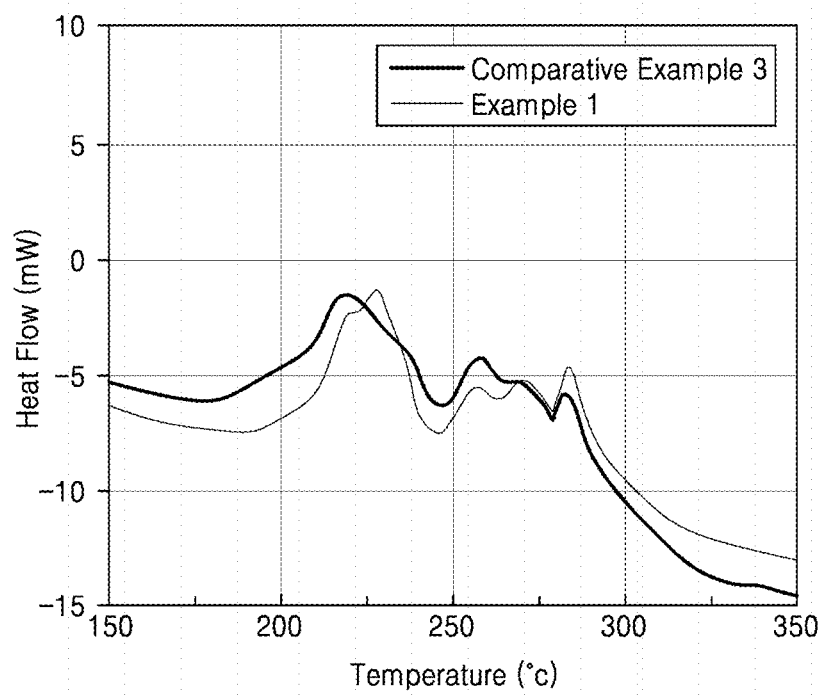
FIG. 5 is a graph of Heat Flow (milliWatts, mW) versus temperature (° C.) which shows differential scanning calorimetry (DSC) thermograms of composite cathode active materials prepared according to Example 1 and Comparative Example 3.

Also, as shown in FIG. 5, the composite cathode active material according to Example 1 exhibited a higher onset temperature where thermal decomposition is initiated than that of the composite cathode active material according to Comparative Example 3.

Therefore, it was confirmed that thermal stability of the composite cathode active material according to Example 1 was improved when compared with the composite cathode active material according to Comparative Example 3.

Evaluation Example 5: Charging/Discharging Characteristics at Room Temperature

The lithium batteries prepared according to Examples 5 to 8 and Comparative Examples 5 to 8 were charged with a constant current rate of 0.1 C at 25° C. until a voltage reached 4.35 V (vs. Li), and then while maintaining the voltage of 4.35 V in a constant voltage mode, the charging process was cut off at a current rate of 0.05 C. Subsequently, the lithium batteries were discharged with a constant current rate of 0.1 C until the voltage reached 2.8 V (vs. Li) ($1^{st}$ cycle, formation cycle).

A C rate is a discharge rate of a cell, and is obtained by dividing a total capacity of the cell by a total discharge period of time of 1 hour, e.g., a C rate for a battery having a discharge capacity of 1.6 ampere-hours would be 1.6 amperes.

The lithium batteries that underwent the $1^{st}$ cycle were charged with a constant current rate of 1.0 C at 25° C. until the voltage reached 4.35 V (vs. Li), and then while maintaining the voltage of 4.35 V in a constant voltage mode, the charging process was cut off at a current rate of 0.05 C. Subsequently, the lithium batteries were discharged with a current rate of 0.2 C until the voltage reached 2.8 V (vs. Li) ($2^{nd}$ cycle).

The lithium batteries that underwent the $2^{nd}$ cycle were charged with a constant current rate of 1 C at 25° C. until the voltage reached 4.35 V (vs. Li), and then while maintaining the voltage of 4.35 V in a constant voltage mode, the charging process was cut off at a current rate of 0.05 C. Subsequently, the lithium batteries were discharged with a current rate of 1 C until the voltage reached 2.8 V (vs. Li) ($3^{rd}$ cycle), and this cycle was repeated 50 times until a $52^{nd}$ cycle under the same conditions.

The lithium batteries were rested for 10 minutes after every charging/discharging cycle.

Some of the charging/discharging tests are shown in Table 3 below. A capacity retention at the $52^{nd}$ cycle is defined as Equation 1.

Capacity retention [%]=[Discharge capacity at $52^{nd}$ cycle/Discharge capacity at $3^{rd}$ cycle]×100%  Equation 1

TABLE 3

| | Discharge capacity at $2^{nd}$ cycle [mAh/g] | Capacity retention [%] |
|---|---|---|
| Comparative Example 6 (core + washing) | 212 | 90.7 |
| Comparative Example 7 (Co/Mg 0.75 wt %, single layer) | 213 | 91.9 |
| Comparative Example 8 (Co/Mg 0.25 wt %, P 0.25 wt %, composite single layer) | 213 | 89.5 |
| Example 5 (Co/Mg 0.25 wt %, P 0.25 wt %, double layer, $Li_2ZrO_3$ grain boundary coating) | 212 | 92.6 |
| Example 6 (Co/Mg 0.50 wt %, P 0.25 wt %, double layer, $Li_2ZrO_3$ grain boundary coating) | 210 | 92.1 |
| Example 8 (Co/Mg 0.25 wt %, P 0.25 wt %, double layer, without $Li_2ZrO_3$ grain boundary coating) | 213 | — |

As shown in Table 3, the lithium batteries according to Examples 5 and 6 had improved lifespan characteristics without substantial capacity reduction when compared with the lithium batteries according to Comparative Examples 6 to 8.

The improvement in lifespan characteristics of the lithium batteries according to Examples 5 and 6 are considered to be obtained since the surfaces of the composite cathode active materials included in the lithium batteries are stabilized by the double-layered coating and side reactions with the electrolytic solution were inhibited thereby.

It is also considered that the second layer additionally included in each of the composite cathode active materials of the lithium batteries according to Examples 5 and 6 more effectively inhibits side reactions with the electrolytic solution than the composite cathode active material included in the lithium battery according to Comparative Example 7.

For example, while not wanting to be bound by theory, it is understood that since the second layer formed on the surface of each of the composite cathode active materials included in the lithium batteries according to Examples 5 and 6 includes $Li_3PO_4$, and the like, wettability to the electrolytic solution of the second layer is improved and a stable solid electrolyte film is formed as a result of reactions between the second layer and moisture, HF, and the like included in the electrolytic solution during initial charging and discharging. As a result, additional side reactions between the composite cathode active material and the electrolytic solution are inhibited, and thus the surface of the composite cathode active material is stabilized.

In addition, since the composite cathode active materials included in the lithium batteries according to Examples 5 and 6 have the multi-layered structure including the first layer and the second layer, lifespan characteristics of the lithium batteries according to Examples 5 and 6 were improved in comparison with the composite cathode active material having the composite single-layered structure including the same components and included in the lithium battery according to Comparative Example 8. In addition, although not shown in Table 3, lifespan characteristics of the lithium battery according to Example 8 were improved in comparison with the lithium battery according to Comparative Example 8.

Also, the lithium battery according to Example 5 had further improved lifespan characteristics when compared with the lithium battery according to Example 8. Improved lifespan characteristics of lithium battery according to Example 5 are considered to be obtained since $Li_2ZrO_3$ is located not only on the surface of the core but also in the grain boundaries each located between the primary particles of the core in the composite cathode active material and coating the primary particles. Thus, side reactions between the primary particles located inside the core and the electrolyte and elution of the transition metal from the primary particles are inhibited and a three-dimensional lithium ion path is formed through the surface of the core and the second phase included in the core.

Evaluation Example 6: Evaluation of Charging/Discharging Characteristics at High Temperature Lithium batteries prepared according to Examples 10 to 13 and Comparative Examples 9 to 12 were charged with a constant current rate of 0.1 C at 45° C. until the voltage reached 4.30 V (vs. graphite, $Li_xC_6$), and then while maintaining the voltage of 4.30 V in a constant voltage mode, the charging process was cut off at a current rate of 0.05 C. Subsequently, the lithium batteries were discharged with a constant current rate of 0.1 C until the voltage reached 2.8 V (vs. graphite, $Li_xC_6$)) ($1^{st}$ cycle, formation cycle). The Gr refers to graphite.

The lithium batteries that underwent the $1^{st}$ cycle were charged with a constant current rate of 1.0 C at 45° C. until the voltage reached 4.30 V (vs. Gr), and then while maintain the voltage of 4.30 V in a constant voltage mode, the charging process was cut off at a current rate of 0.05 C.

Subsequently, the lithium batteries were discharged with a current rate of 0.2 C until the voltage reached 2.8 V (vs. Gr) ($2^{nd}$ cycle).

The lithium batteries that underwent the $2^{nd}$ cycle were charged with a constant current rate of 1 C at 45° C. until the voltage reached 4.30 V (vs. Gr), and then while maintaining the voltage of 4.30 V in a constant voltage mode, the charging process was cut off at a current rate of 0.05 C. Subsequently, the lithium batteries were discharged with a current rate of 1 C until the voltage reached 2.8 V (vs. Gr) ($3^{rd}$ cycle), and this cycle was repeated 300 times until a $302^{nd}$ cycle under the same conditions.

The lithium batteries were rested for 10 minutes after every charging/discharging cycle.

Some of the charging/discharging tests are shown in Table 4 below. A capacity retention ratio at the 302th cycle is defined as Equation 2 below.

$$\text{Capacity retention [\%]} = [\text{Discharge capacity at } 302^{nd} \text{ cycle/Discharge capacity at } 3^{rd} \text{ cycle}] \times 100\% \quad \text{Equation 2}$$

TABLE 4

| | Capacity retention ratio [%] |
|---|---|
| Comparative Example 11 (Co/Mg 0.75 wt %, single layer) | 82.7 |
| Example 10 (Co/Mg 0.25 wt %, P 0.25 wt %, double layer) | 85.5 |

As shown in Table 4, the lithium battery according to Example 10 had improved lifespan characteristics at high temperature when compared with the lithium battery according to Comparative Example 11.

The improvement in lifespan characteristics of the lithium battery according to Example 10 at high temperature are considered to be obtained since the composite cathode active material included in the lithium battery of Example 10 additionally includes the second layer further stabilizing the surface of the composite cathode active material when compared with the composite cathode active material included in the lithium battery according to Comparative Example 11.

For example, it is considered that elution of the metal ions is more effectively inhibited at high temperature since the second layer serves as a protecting layer.

Evaluation Example 7: Evaluation of Charging/Discharging Characteristics at Room Temperature (Evaluation of Effect of Addition of 5% of LFP)

Lithium batteries prepared according to Examples 5 and 9 were charged with a constant current rate of 0.1 C at 25° C. until the voltage reached 4.30 V (vs. Li), and then while maintaining the voltage of 4.30 V in a constant voltage mode, the charging process was cut off at a current rate of 0.05 C. Subsequently, the lithium batteries were discharged with a constant current rate of 0.2 C until the voltage reached 2.8 V (vs. Li) ($1^{st}$ cycle, formation cycle).

The lithium batteries that underwent the $1^{st}$ cycle were charged with a constant current rate of 0.33 C at 25° C. until the voltage reached 4.30 V (vs. Li), and then while maintain the voltage of 4.30 V in a constant voltage rate, the charging process was cut off at a current rate of 0.05 C. Subsequently, the lithium batteries were discharged with a current rate of 0.2 C until the voltage reached 2.8 V (vs. Li) ($2^{nd}$ cycle).

The lithium batteries that underwent the $2^{nd}$ cycle were charged with a constant current rate of 0.33 C at 25° C. until the voltage reached 4.30 V (vs. Li), and then while maintaining the voltage of 4.30 V in a constant voltage mode, the charging process was cut off at a current rate of 0.05 C. Subsequently, the lithium batteries were discharged with a current rate of 0.2 C until the voltage reached 2.8 V (vs. Li) ($3^{rd}$ cycle).

The lithium batteries that underwent the $3^{rd}$ cycle were charged with a constant current rate of 1 C at 25° C. until the voltage reached 4.30 V (vs. Li), and then while maintaining the voltage of 4.30 V in a constant voltage mode, the charging process was cut off at a current rate of 0.05 C.

A discharge capacity at the $3^{rd}$ cycle was used as a standard capacity.

An initial efficiency is defined as Equation 3 below.

$$\text{Initial efficiency [\%]} = [\text{Discharge capacity at } 1^{st} \text{ cycle/Charge capacity at } 1^{st} \text{ cycle}] \times 100\% \quad \text{Equation 3}$$

TABLE 5

| | Discharge capacity at $1^{st}$ cycle [mAh] | Initial efficiency [%] | Standard capacity [mAh] |
|---|---|---|---|
| Example 5 | 492 | 87.4 | 490 |
| Example 9 | 499 | 88.6 | 494 |

As shown in Table 5, the lithium battery according to Example 9 further including $LiFePO_4$ had improved initial discharge capacity, initial charging/discharging efficiency, and standard capacity when compared with the lithium battery according to Example 5.

Evaluation Example 8: DC-IR Evaluation at Room Temperature (25° C.) (Evaluation of Addition of 5% of LFP)

Initial DC-IR of the lithium batteries prepared according to Examples 5 and 9 were measured at room temperature (25° C.) according to the following method.

At the $1^{st}$ cycle, after the lithium batteries were charged with a current rate of 0.5 C to a state of charge (SOC) of 50%,
 the charging process was cut off at a current rate of 0.02 C and the lithium batteries were rested for 10 minutes,
 the lithium batteries were discharged with a constant current rate of 0.5 C for 30 second and rested for 30 seconds, and then the lithium batteries were charged with a current rate of 0.5 C for 30 seconds and rested form 10 seconds,
 the lithium batteries were discharged with a constant current rate of 1.0 C for 30 seconds and rested for 30 seconds, and then the lithium batteries were charged with a current rate of 0.5 C for 1 minute and rested for 10 minutes,
 the lithium batteries were discharged with a constant current rate of 2.0 C for 30 seconds and rested for 30 seconds, and then the lithium batteries were charged with a current rate of 0.5 C for 2 minute and rested for 10 minutes, and
 the lithium batteries were discharged with a constant current rate of 3.0 C for 30 seconds and rested for 30 seconds, and then the lithium batteries were charged with a current rate of 0.5 C for 3 minute and rested for 10 minutes.

An average voltage drop for 30 seconds for each C-rate is a DC voltage value. DC-IR was calculated based on the measured DC voltage and shown in Table 6 below.

TABLE 6

|  | Initial DC-IR [mΩ] |
|---|---|
| Example 5 | 126 |
| Example 9 | 122 |

As shown in Table 6, the lithium battery according to Example 9 further including LiFePO$_4$ had a decreased initial DC-IR when compared with the lithium battery according to Example 5.

Evaluation Example 9: Evaluation of Charging/Discharging Characteristics at High Temperature (Evaluation of Addition of 5% of LFP)

The lithium batteries prepared according to Examples 10 and 14 were charged with a constant current rate of 0.1 C at 45° C. until the voltage reached 4.30 V (vs. Gr), and then while maintaining the voltage of 4.30 V in a constant voltage mode, the charging process was cut off at a current of 0.05 C. Subsequently, the lithium batteries were discharged with a constant current rate of 0.1 C until the voltage reached 2.8 V (vs. Gr) (1$^{st}$ cycle, formation cycle).

The lithium batteries that underwent the 1$^{st}$ cycle were charged with a constant current rate of 1.0 C at 45° C. until the voltage reached 4.30 V (vs. Gr), and then while maintaining the voltage of 4.30 V in a constant voltage mode, the charging process was cut off at a current rate of 0.05 C. Subsequently, the lithium batteries were discharged with a current rate of 0.2 C until the voltage reached 2.8 V (vs. Gr) (2$^{nd}$ cycle).

The lithium batteries that underwent the 2$^{nd}$ cycle were charged with a constant current rate of 1 C at 45° C. until the voltage reached 4.30 V (vs. Gr), and then while maintaining the voltage of 4.30 V in a constant voltage mode, the charging process was cut off at a current rate of 0.05 C. Subsequently, the lithium batteries were discharged with a current rate of 1 C until the voltage reached 2.8 V (vs. Gr) (3$^{rd}$ cycle), and this cycle was repeated 200 times until a 202$^{nd}$ cycle under the same conditions.

The lithium batteries were rested for 10 minutes after every charging/discharging cycle.

Some of the charging/discharging tests are shown in Table 7 below. A capacity retention ration of the 202$^{nd}$ cycle is defined as Equation 4 below.

Capacity retention [%]=[Discharge capacity at 202$^{nd}$ cycle/Discharge capacity at 3$^{rd}$ cycle]×100%  Equation 4

TABLE 7

|  | capacity retention [%] |
|---|---|
| Example 10 | 88.8 |
| Example 14 | 89.9 |

As shown in Table 7, the lithium battery according to Example 14 further including LiFePO$_4$ had improved lifespan characteristics when compared with the lithium battery according to Example 11.

According to the present disclosure, the composite cathode active material includes a multi-layered coating layer in which the first layer including the first metal and the second layer including P are sequentially stacked, and thus cycle characteristics and thermal stability of the lithium battery are improved.

It should be understood that embodiments described herein should be considered in a descriptive sense only and not for purposes of limitation. Descriptions of features or aspects within each embodiment should be considered as available for other similar features or aspects in other embodiments.

While an embodiment has been described with reference to the figures, it will be understood by those of ordinary skill in the art that various changes in form and details may be made therein without departing from the spirit and scope as defined by the following claims.

What is claimed is:

1. A composite cathode active material comprising:
a core comprising a plurality of primary particles; and
a shell on the core,
wherein the primary particles comprise a first lithium transition metal oxide comprising nickel,
wherein the shell comprises a first layer and a second layer on the first layer,
wherein the first layer comprises a first composition represented by Formula 1A:

wherein, in Formula 1A,
M1 comprises cobalt,
0.9≤b≤3.1, and 1.9≤c≤4.1,
the second layer comprises a second composition comprising cobalt and phosphorus, and an amount of the second composition included in the second layer is about 2 parts by weight or less based on 100 parts by weight of the first lithium transition metal oxide, and
wherein the core comprises a grain boundary located between primary particles of the plurality of primary particles, and the grain boundary comprises a third composition comprising Li$_2$ZrO$_3$.

2. The composite cathode active material of claim 1, wherein the first composition has a different structure than the second composition.

3. The composite cathode active material of claim 1, wherein the first composition has a layered crystal structure or a spinel crystal structure.

4. The composite cathode active material of claim 3, wherein the layered crystal structure belongs to an R-3m space group, and the spinel crystal structure belongs to an Fd-3m space group.

5. The composite cathode active material of claim 1, wherein the first layer is on a surface of a primary particle of the plurality of primary particles, and a concentration of M1 in Formula 1A comprised in the first layer is greater than a concentration of M1 comprised in the plurality of primary particles.

6. The composite cathode active material of claim 1, wherein a thickness of the second layer is greater than a thickness of the first layer, the thickness of the first layer is 50 nanometers or less, and the thickness of the second layer is 500 nanometers or less.

7. The composite cathode active material of claim 1,
wherein the first layer further comprises a first compound comprising
0 moles to about 3.3 moles of lithium per 1 mole of the first compound,
about 0.7 moles to about 3.3 moles of M1 in Formula 1A per 1 mole of the first compound, and about 1.7 moles to about 4.3 moles of oxygen per 1 mole of the first compound.

8. The composite cathode active material of claim 1, wherein
the first layer further comprises a second compound represented by Formula 1B:

$$Li_aM1_bO_c \qquad \text{Formula 1B}$$

wherein, in Formula 1B, M1 is at least one of cobalt, magnesium, zirconium, aluminum, manganese, silicon, palladium, titanium, tin, iridium, platinum, ruthenium, cerium, boron, niobium, vanadium, iron, or zinc, $0<a\leq3.1$, $0.9\leq b\leq3.1$, and $1.9\leq c\leq4.1$.

9. The composite cathode active material of claim 1, wherein the first composition comprises $Co_3O_4$.

10. The composite cathode active material of claim 1, wherein an amount of the first composition contained in the first layer is 10 parts by weight or less, based on 100 parts by weight of the first lithium transition metal oxide, or wherein an amount of M1 of Formula 1A contained in the first layer is 10 parts by weight or less, based on 100 parts by weight of the first lithium transition metal oxide.

11. The composite cathode active material of claim 1, wherein the second composition is a composition comprising M1 of Formula 1A, phosphorus, and oxygen, or a composition comprising lithium, M1 of Formula 1A, phosphorus, and oxygen,
wherein the second composition comprises
0 moles to about 3.3 moles of lithium, per 1 mole of the second composition,
about 0.7 moles to about 3.3 moles of the first metal, per 1 mole of the second composition,
about 0.7 moles to about 2.3 moles of phosphorus, per 1 mole of the second composition, and
about 3.7 moles to about 8.3 moles of the oxygen, per 1 mole of the second composition.

12. The composite cathode active material of claim 1, wherein the second composition is represented by Formula 2 below:

$$Li_aM2_b(PO_4)_c \qquad \text{Formula 2}$$

wherein, in Formula 2, M2 is at least one of cobalt, magnesium, zirconium, aluminum, manganese, silicon, palladium, nickel, titanium, tin, molybdenum, iridium, platinum, ruthenium, cerium, boron, niobium, vanadium, iron, or zinc, and
$0\leq a\leq3.1$, $0.9\leq b\leq3.1$, and $0.9\leq c\leq2.1$.

13. The composite cathode active material of claim 1, wherein the second composition comprises at least one of $LiCoPO_4$ or $Co_3(PO_4)_2$.

14. The composite cathode active material of claim 1, wherein the third composition has a monoclinic crystal structure, and the monoclinic crystal structure belongs to a C2/m, C12/c1, or C2/c space group.

15. The composite cathode active material of claim 1, wherein the shell further comprises the third composition.

16. The composite cathode active material of claim 1, wherein the first lithium transition metal oxide comprises a second metal, wherein the second metal is zirconium, aluminum, cobalt, magnesium, manganese, silicon, molybdenum, palladium, titanium, tin, iridium, platinum, ruthenium, cerium, boron, niobium, vanadium, iron, or zinc.

17. The composite cathode active material of claim 1, wherein the first lithium transition metal oxide comprises lithium, nickel, a second metal, a third metal, and oxygen,
wherein the first lithium transition metal oxide comprises
about 0.1 moles to about 1.3 moles of lithium, per 1 mole of the first lithium transition metal oxide,
about 0.7 moles to about 0.99 moles of nickel, per 1 mole of the first lithium transition metal oxide,
about 0.001 moles to about 0.01 moles of the second metal, per 1 mole of the first lithium transition metal oxide,
about 0.01 moles to about 0.3 moles of the third metal, per 1 mole of the first lithium transition metal oxide, and
about 1.7 moles to about 2.3 moles of oxygen, per 1 mole of the first lithium transition metal oxide, and
wherein the third metal is a metal other than lithium, nickel, and the second metal.

18. The composite cathode active material of claim 1, wherein the first lithium transition metal oxide is represented by Formula 4:

$$Li_aM4O_{2-\alpha}X_\alpha \qquad \text{Formula 4}$$

wherein, in Formula 4, $0.9\leq a\leq1.1$ and $0\leq\alpha<2$,
M4 is nickel, a second metal, and a third metal, wherein the third metal comprises at least one element of Groups 2 to 13 of the Periodic Table, other than nickel and the second metal, and an amount of nickel contained in M4 is about 70 mole percent to about 100 mole percent, and
X is at least one of oxygen, fluorine, sulfur, or phosphorus.

19. The composite cathode active material of claim 1, wherein the first lithium transition metal oxide is represented by Formula 5:

$$Li_aNi_bM5_cM6_dM7_eO_{2-\alpha}X_\alpha \qquad \text{Formula 5}$$

wherein, in Formula 5, $0.9\leq a\leq1.1$, $0.7<b<1.0$, $0<c<0.3$, $0<d<0.3$, $0\leq e<0.1$, $b+c+d+e=1$, and $0\leq\alpha<2$,
M5, M6, and M7 are different from each other and are each independently cobalt, manganese, zirconium, aluminum, rhenium, vanadium, chromium, iron, boron, ruthenium, titanium, niobium, molybdenum, magnesium, or platinum, and
X is at least one of oxygen, fluorine, sulfur, or phosphorus.

20. The composite cathode active material of claim 1, wherein the first lithium transition metal oxide is represented by at least one of Formula 6, and Formula 7:

$$Li_aNi_bCo_cMn_dM8_eO_{2-\alpha}X_\alpha, \text{ and} \qquad \text{Formula 6}$$

$$Li_aNi_bCo_cAl_dM8_eO_{2-\alpha}X_\alpha \qquad \text{Formula 7}$$

wherein, in Formulae 6 and 7, a, b, c, d, e, and $\alpha$ are each independently $0.9\leq a\leq1.1$, $0.7<b<1.0$, $0<c<0.1$, $0<d<0.1$, $0\leq e<0.01$, $b+c+d+e=1$, and $0\leq\alpha\leq2$,
M8 is at least one of zirconium, aluminum, vanadium, chromium, iron, rhenium, boron, ruthenium, titanium, niobium, molybdenum, magnesium, or platinum, and
X is at least one of oxygen, fluorine, sulfur, or phosphorus.

21. The composite cathode active material of claim 1, wherein the first lithium transition metal oxide is represented by Formula 8:

$$aLi_2MnO_3\cdot(1-a)LiMO_{2-\alpha}X_\alpha \qquad \text{Formula 8}$$

wherein, in Formula 8, $0<a<1$ and $0\leq\alpha\leq2$,
M is at least two elements of nickel, cobalt, manganese, zirconium, aluminum, rhenium, vanadium, chromium, iron, boron, ruthenium, titanium, niobium, molybdenum, magnesium, or platinum, and X is at least one of oxygen, fluorine, sulfur, or phosphorus.

22. A cathode comprising the composite cathode active material according to claim 1.

23. The cathode of claim 22, wherein the cathode further comprises a cathode active material having an olivine structure.

24. The cathode of claim 23, wherein an amount of the cathode active material having the olivine structure is 10 weight percent or less, based on a total weight of the cathode active material.

25. A lithium battery comprising:
the cathode according to claim 22;
an anode; and
an electrolyte between the cathode and the anode.

26. A method of preparing a composite cathode active material, the method comprising:
providing a first lithium transition metal oxide;
mixing the first lithium transition metal oxide with a first metal precursor to prepare a first composition;
mixing the first composition with a phosphorus precursor to preparing a second composition;
drying the second composition; and
heat-treating the dried second composition at a temperature of about 400° C. to about 1000° C. under an oxidizing atmosphere to prepare the composite cathode active material of claim 1.

27. The method of claim 26, wherein the providing the first lithium transition metal oxide comprises:
mixing a precursor of the first lithium transition metal oxide and a second metal precursor to prepare a mixture; and
heat-treating the mixture at a temperature of about 400° C. to about 1000° C. under an oxidizing atmosphere to prepare the first lithium transition metal oxide.

28. The composite cathode active material of claim 1, wherein the first lithium transition metal oxide further comprises a second metal, wherein the second metal is zirconium.

29. A composite cathode active material comprising:
a core comprising a plurality of primary particles; and
a shell on the core,
wherein the primary particles comprise a first lithium transition metal oxide comprising nickel,
wherein the first lithium transition metal oxide comprises a second metal, wherein the second metal comprises zirconium,
wherein the shell comprises a first layer and a second layer on the first layer,
wherein the first layer comprises a first composition represented by Formula 1A:

wherein, in Formula 1A,
M1 is at least one of cobalt, magnesium, zirconium, aluminum, manganese, silicon, palladium, titanium, tin, iridium, platinum, ruthenium, cerium, boron, niobium, vanadium, iron, and zinc,
$0.9 \leq b \leq 3.1$, and $1.9 \leq c \leq 4.1$,
the second layer comprises a second composition comprising cobalt and phosphorus, and an amount of the second composition included in the second layer is about 2 parts by weight or less based on 100 parts by weight of the first lithium transition metal oxide, and
wherein the core comprises a grain boundary located between primary particles of the plurality of primary particles, and the grain boundary comprises a third composition comprising $Li_2ZrO_3$.

* * * * *